United States Patent
Sasagawa et al.

(10) Patent No.: US 10,074,187 B2
(45) Date of Patent: Sep. 11, 2018

(54) IMAGE RECOGNITION SYSTEM AND SEMICONDUCTOR INTEGRATED CIRCUIT

(71) Applicant: SOCIONEXT INC., Kanagawa (JP)

(72) Inventors: Yukihiro Sasagawa, Kyoto (JP); Tatsuya Tetsukawa, Osaka (JP); Michael Bi Mi, Singapore (SG); Chua Tien Ping, Singapore (SG); Ryuta Nakanishi, Kyoto (JP); Naoki Nojiri, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 15/247,337

(22) Filed: Aug. 25, 2016

(65) Prior Publication Data
US 2016/0364882 A1 Dec. 15, 2016

Related U.S. Application Data

(63) Continuation of application No. PCT/JP2015/000298, filed on Jan. 23, 2015.

(30) Foreign Application Priority Data

Feb. 26, 2014 (JP) .................... 2014-035060

(51) Int. Cl.
*G06K 9/00* (2006.01)
*G06T 7/20* (2017.01)
(Continued)

(52) U.S. Cl.
CPC ........ *G06T 7/2033* (2013.01); *G06K 9/00335* (2013.01); *G06K 9/00986* (2013.01);
(Continued)

(58) Field of Classification Search
CPC . G06T 2207/10016; G06T 2207/30196; G06T 2207/30201; G06T 2207/30236;
(Continued)

(56) References Cited

U.S. PATENT DOCUMENTS

| | | | | |
|---|---|---|---|---|
| 5,627,586 A | * | 5/1997 | Yamasaki | F41G 7/2226 348/169 |
| 6,185,314 B1 | * | 2/2001 | Crabtree | G01S 3/7865 348/169 |

(Continued)

FOREIGN PATENT DOCUMENTS

| | | |
|---|---|---|
| CN | 101038672 A | 9/2007 |
| CN | 101593346 A | 12/2009 |

(Continued)

OTHER PUBLICATIONS

Kenichi Jyoko et al., "C-Based design of a Real-time Particle Tracking System" IPSJ SIG Technical Reports, Dec. 2, 2005, vol. 2005, No. 121, pp. 163-168; with English abstract and cited in International Search Report and Written Opinion.

(Continued)

*Primary Examiner* — Aklilu Woldemariam
(74) *Attorney, Agent, or Firm* — McDermott Will & Emery LLP

(57) ABSTRACT

An image recognition system for detecting and tracking at least an image portion associated with a predefined object from a moving picture is configured to be able to perform: an object detection processing step of detecting the object; a tracking point specification processing step of specifying a predetermined point as a tracking point; a tracking target recognition processing step of recognizing an actual tracking target based on the tracking point; a tracking processing step of tracking the tracking target; and a determination processing step of determining the type of the tracking target's behavior. The tracking point specification processing step and the determination processing step are implemented by software, while the object detection processing step, the tracking target recognition processing step, and the tracking processing step are implemented by hardware.

10 Claims, 15 Drawing Sheets

(51) Int. Cl.
G06K 9/46 (2006.01)
G06T 7/246 (2017.01)
G06K 9/32 (2006.01)

(52) U.S. Cl.
CPC ......... G06K 9/4642 (2013.01); G06K 9/4661 (2013.01); G06T 7/246 (2017.01); *G06K 9/00* (2013.01); *G06K 9/00362* (2013.01); *G06K 2009/3291* (2013.01); *G06T 2207/10016* (2013.01); *G06T 2207/20081* (2013.01); *G06T 2207/30201* (2013.01); *G06T 2207/30232* (2013.01); *G06T 2207/30268* (2013.01)

(58) Field of Classification Search
CPC ..... G06T 7/277; G06T 7/2006; G06T 7/2053; G06T 7/208; G06T 7/215; G06T 7/254; G06T 7/20; G06T 7/246; G06T 2207/30241; G06T 7/11; G06T 7/162; G06T 2207/20021; G06T 2207/30204; G06T 2207/30088; G06T 7/248; G06T 7/74; G06T 2207/20016; G06T 2207/20064; G06T 11/00; G06T 11/206; G06T 15/08; G06T 2207/30232; G06T 2207/20081; G06F 3/012; G06F 3/017; G06F 17/30994; G06F 2216/03; G06K 9/6202; G06K 9/00295; G06K 9/22; G06K 9/228; G06K 9/32; G06K 9/46; G06K 9/6231; G06K 9/78; G06K 9/00201; G06K 9/00369; G06K 9/00791; G06K 9/00805; G06K 9/00825; G06K 9/6215; G06K 2009/3291; G06K 9/00335; G06K 9/00362; G06K 9/00986; G06K 9/4642; G06K 9/4661; G01S 3/7865; G01S 11/12; G01S 3/7864; G08B 13/19602; G06Q 10/06; G06Q 10/0635
USPC ........ 382/103, 169, 700; 348/135, 169, 700; 708/523, 316, 524, 490, 603
See application file for complete search history.

(56) References Cited

U.S. PATENT DOCUMENTS

| | | | | |
|---|---|---|---|---|
| 6,263,088 B1* | 7/2001 | Crabtree | ............... | G01S 3/7865 348/169 |
| 6,295,367 B1* | 9/2001 | Crabtree | ............... | G01S 3/7865 382/103 |
| 6,526,430 B1 | 2/2003 | Hung et al. | | |
| 7,957,567 B2 | 6/2011 | Yamaguchi | | |
| 8,374,393 B2 | 2/2013 | Cobb et al. | | |
| 2001/0055063 A1* | 12/2001 | Nagai | ....................... | G01S 5/16 348/116 |
| 2005/0151743 A1* | 7/2005 | Sitrick | ................... | G09G 5/377 345/473 |
| 2007/0162529 A1 | 7/2007 | Sato et al. | | |
| 2008/0170751 A1* | 7/2008 | Lei | .......... | G06T 7/215 382/103 |
| 2010/0036792 A1* | 2/2010 | Sawada | ................... | G10L 17/10 706/52 |
| 2010/0045799 A1* | 2/2010 | Lei | ..................... | G06K 9/00369 348/169 |
| 2010/0080415 A1* | 4/2010 | Qureshi | ............ | G06K 9/00624 382/103 |
| 2010/0231731 A1* | 9/2010 | Motomura | ......... | H04N 5/23248 348/208.4 |
| 2011/0043537 A1* | 2/2011 | Dellon | .................... | G09B 9/00 345/647 |
| 2011/0317874 A1 | 12/2011 | Ikenoue | | |
| 2015/0005937 A1* | 1/2015 | Ponulak | ................. | G06N 3/049 700/253 |
| 2016/0094790 A1* | 3/2016 | Yu | ......................... | G01S 3/7864 348/169 |

FOREIGN PATENT DOCUMENTS

| | | |
|---|---|---|
| JP | 2001-236496 A | 8/2001 |
| JP | 2007-141132 A | 6/2007 |
| JP | 2010-072723 A | 4/2010 |
| JP | 2010-102586 A | 5/2010 |
| JP | 2010-134713 A | 6/2010 |
| JP | 2010-191826 A | 9/2010 |

OTHER PUBLICATIONS

Takahiro Sakayori et al. "Implementation of Hardware Engine for Real-Time KLT Tracker" The Journal of the Institute of Image Electronics Engineers of Japan, Sep. 25, 2009, vol. 38, No. 5, pp. 656-663; with English abstract and cited in International Search Report and Written Opinion.
Pedro F. Felzenszwalb et al. "Object Detection with Discriminatively Trained Part Based Models" Pattern Analysis and Machine Intelligence, IEEE Transactions, vol. 32, No. 9, pp. 1627-1645, Sep. 2010.
Yi Yang et al. "Articulated pose estimation with flexible mixtures-of-parts" Computer Vision and Pattern Recognition (CVPR), 2011 IEEE Conference, pp. 1385-1392, Jun. 20-25, 2011.
Atsushi Atarashi et al. "Low Power Application" NEC Technical Journal, vol. 62, No. 3. 2009, pp. 97-101; partial English translation.
International Search Report and Written Opinion issued in International Patent Application No. PCT/JP2015/000298, dated Feb. 24, 2015; with partial English translation.
Office Action issued in corresponding Chinese Application No. 201580010518.6 dated Apr. 28, 2018 (with English translation).

* cited by examiner

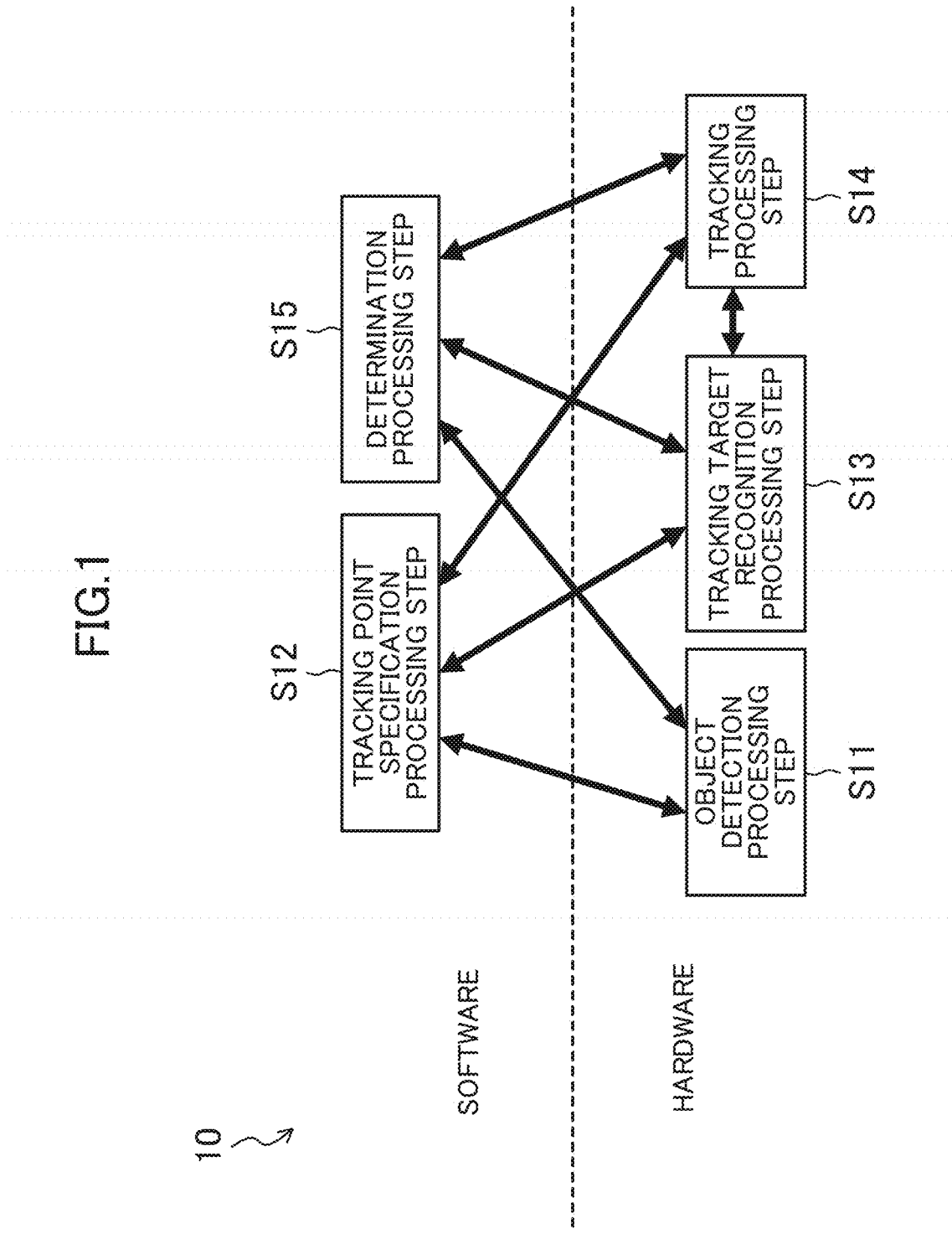

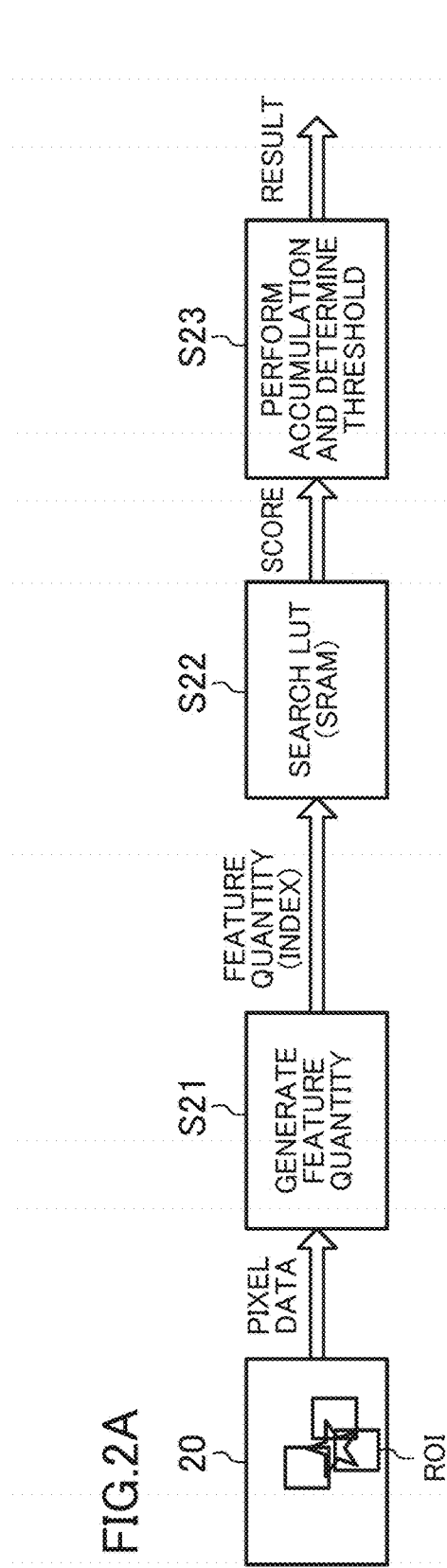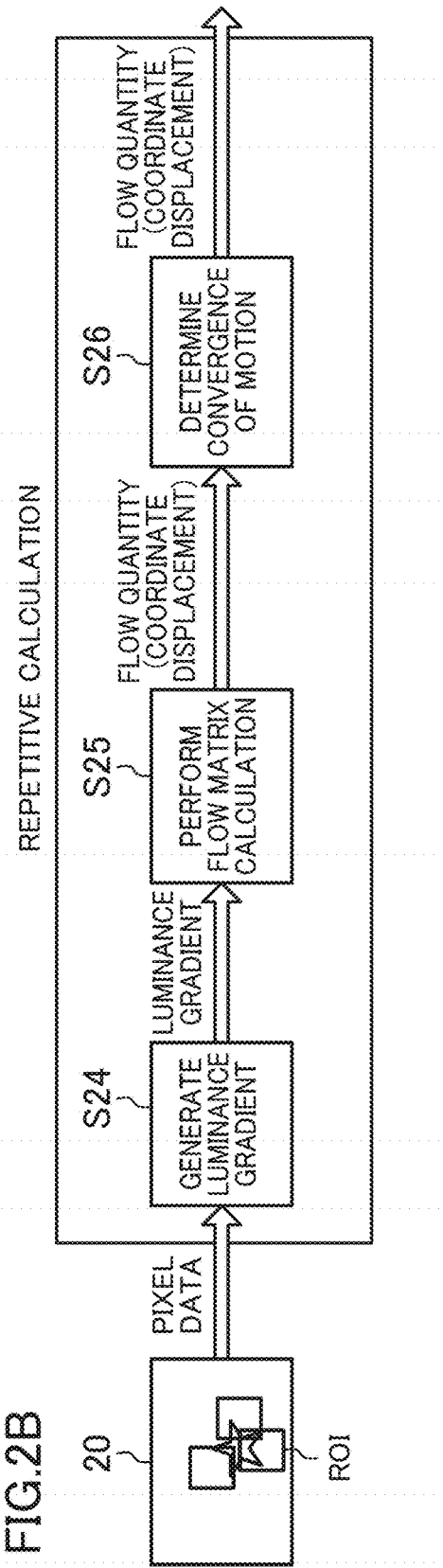

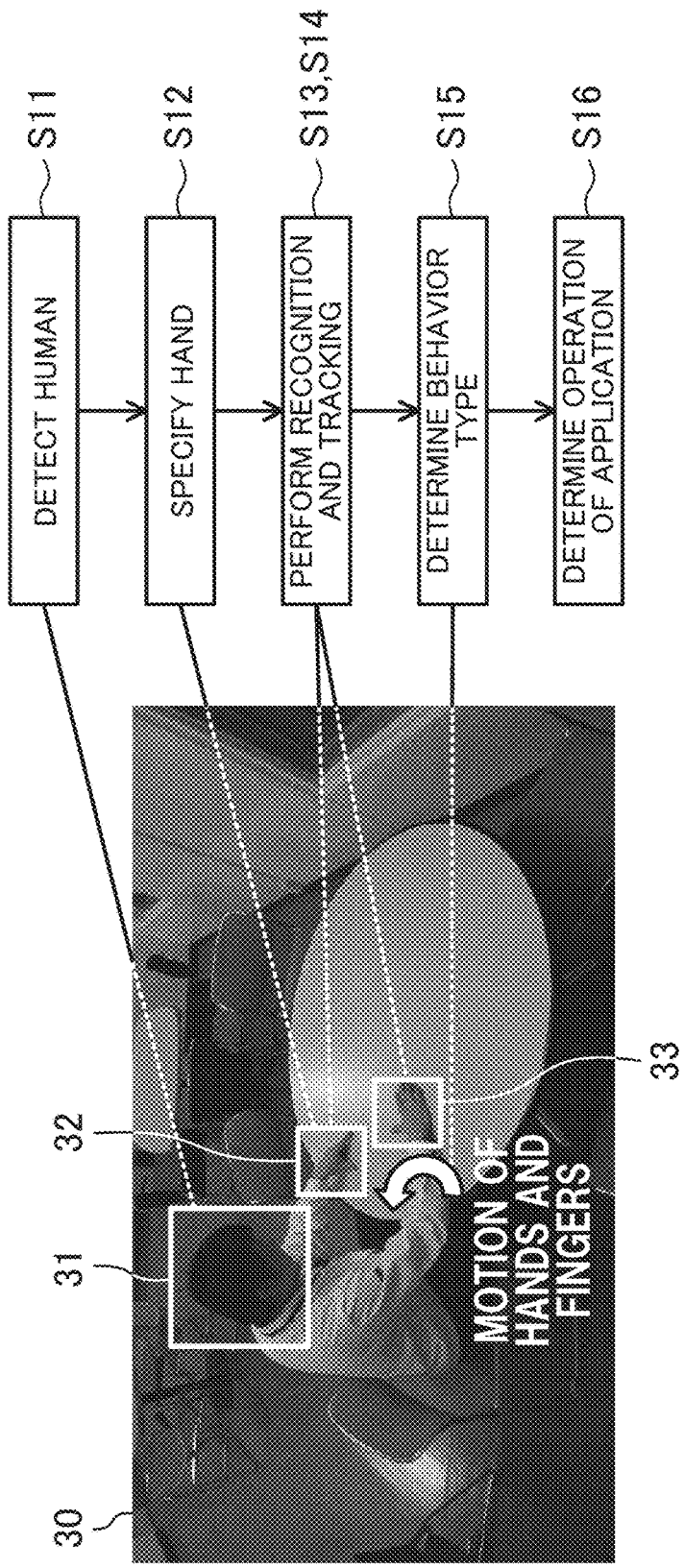

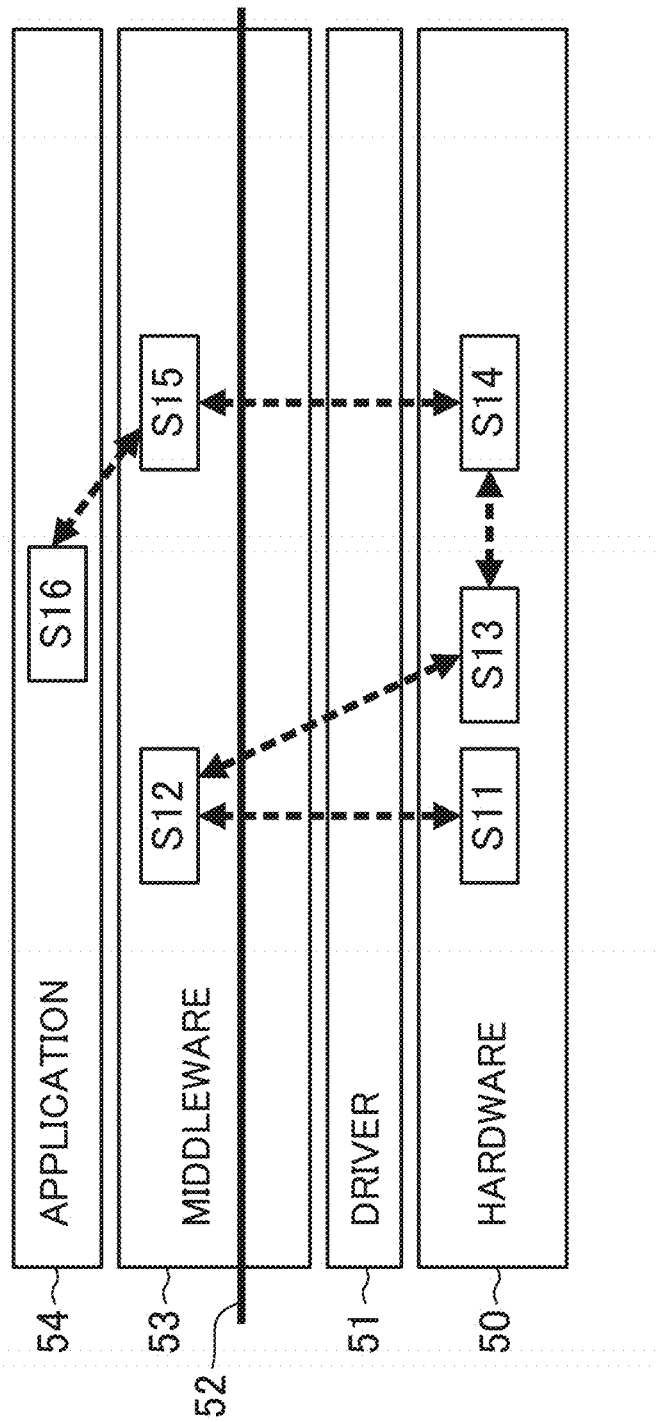

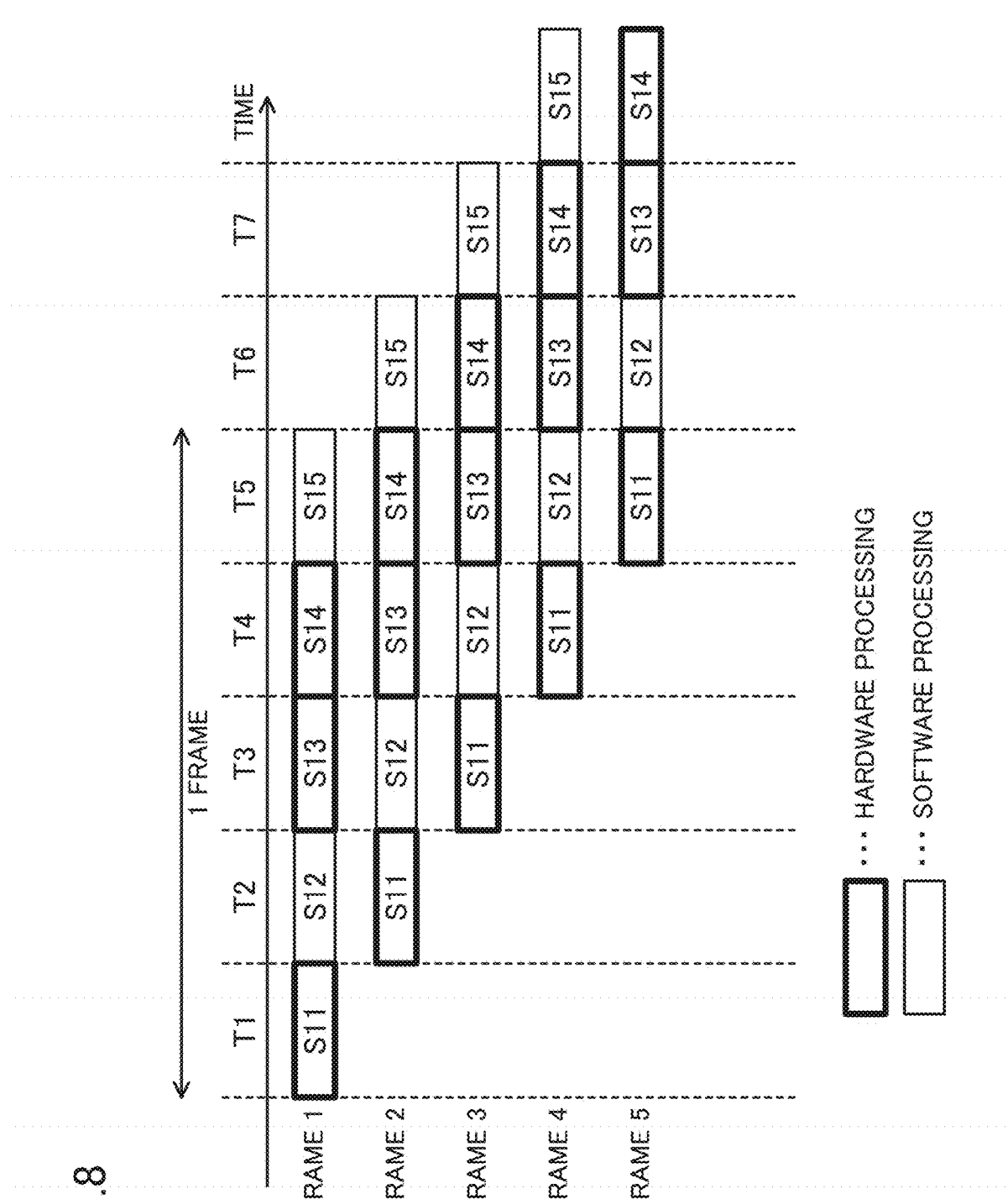

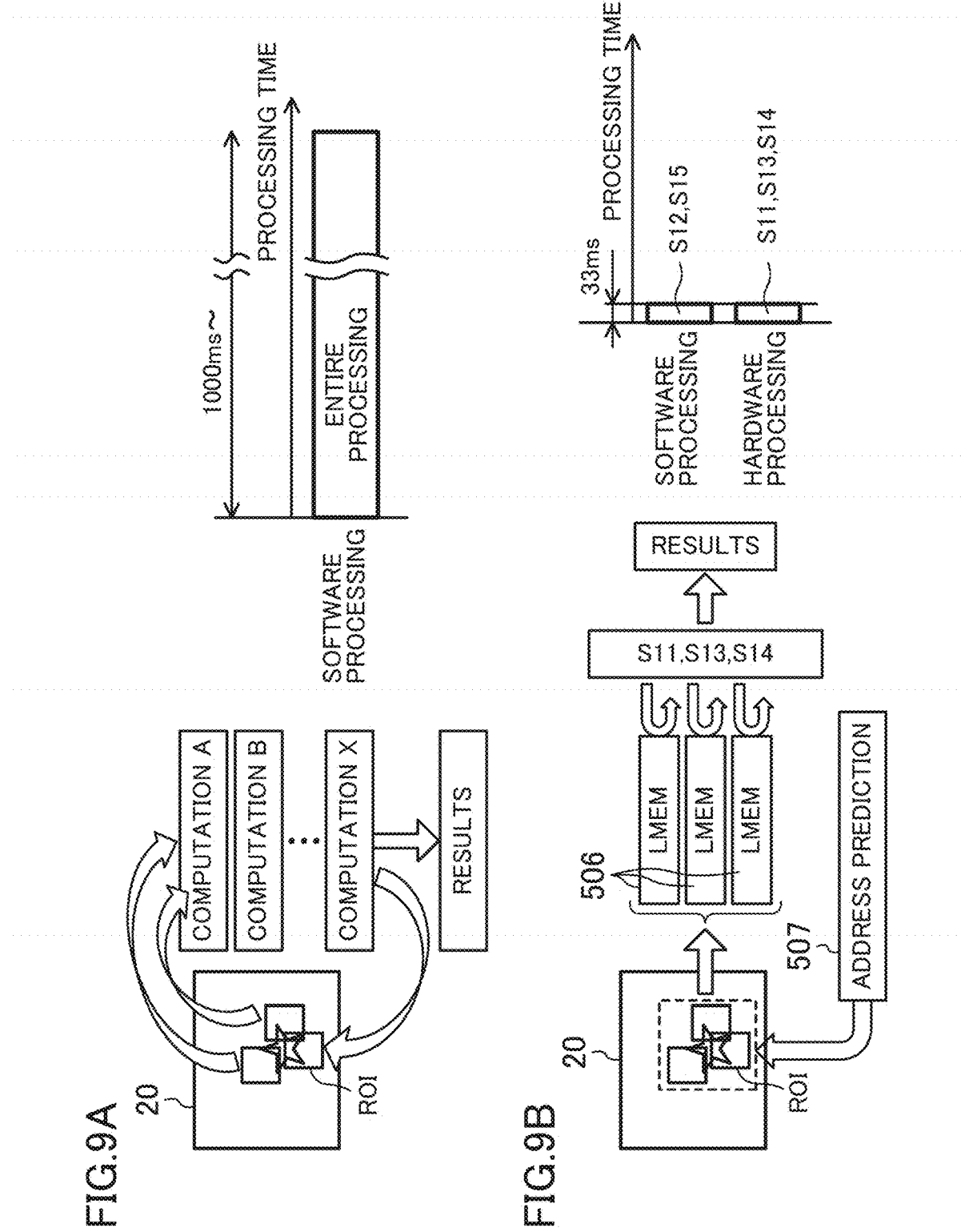

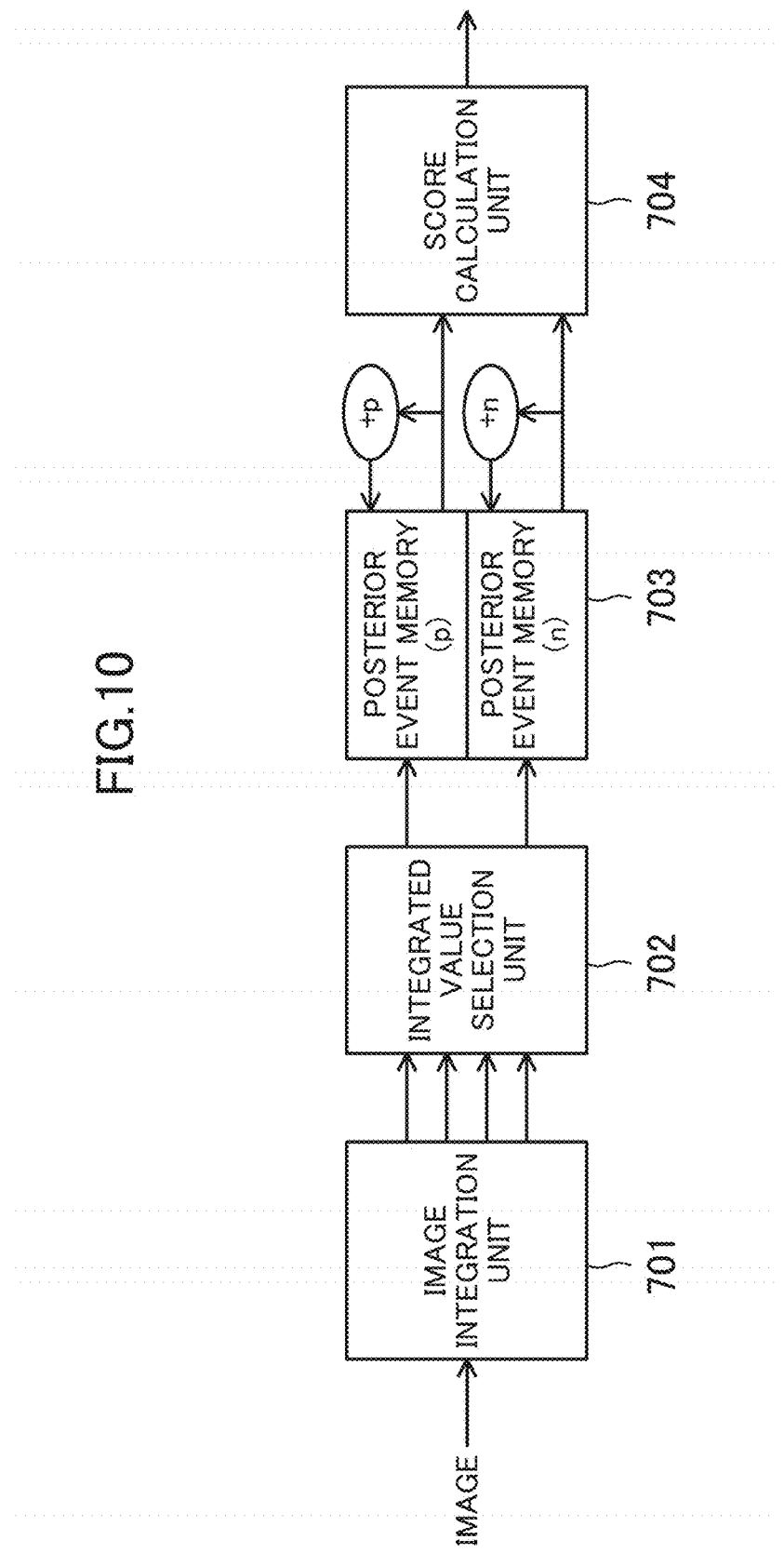

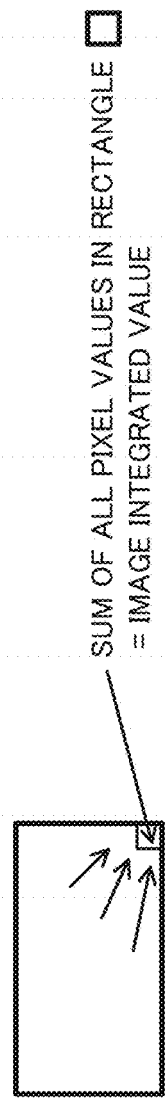
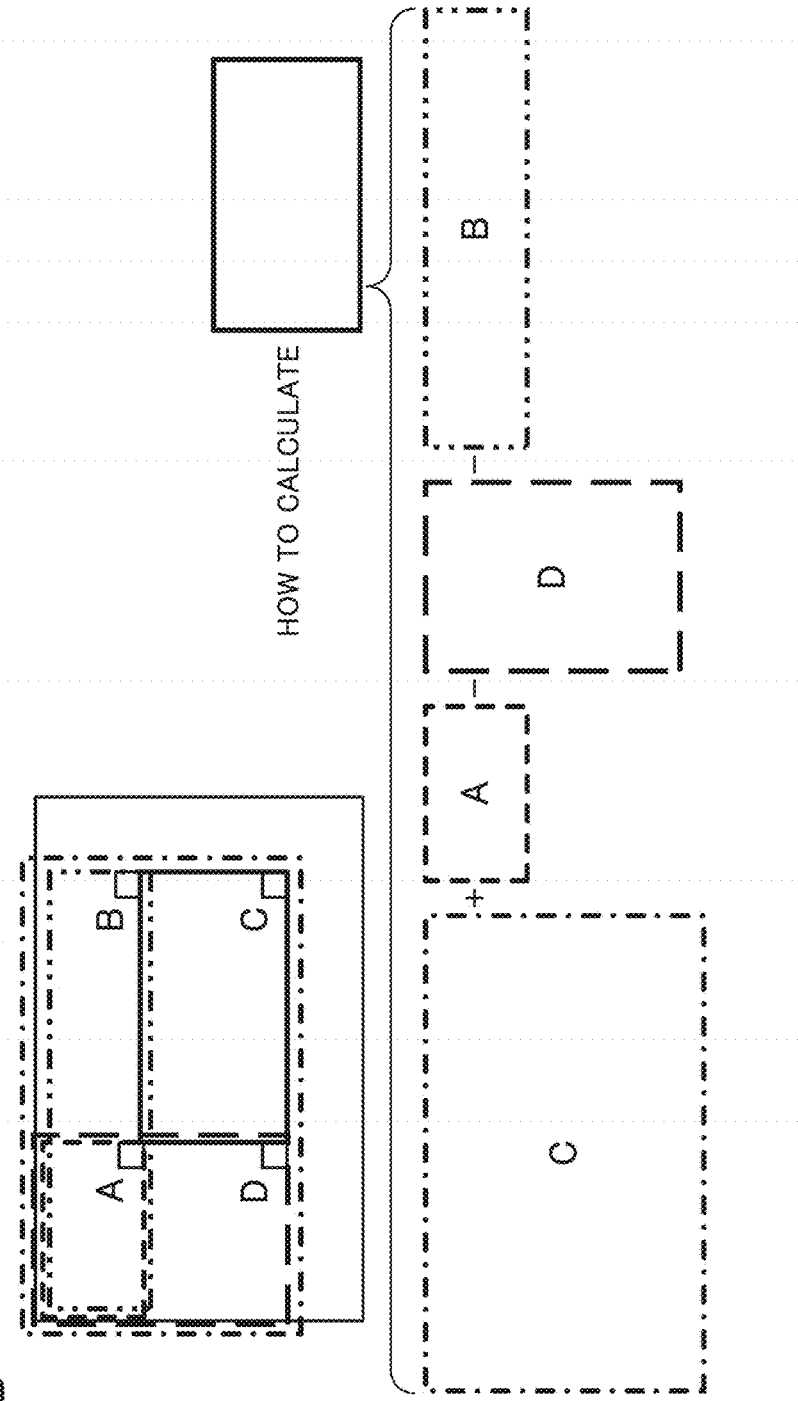
FIG. 11A IMAGE INTEGRATED VALUE
FIG. 11B SUM OF PIXEL VALUES IN ARBITRARY RECTANGULAR AREA

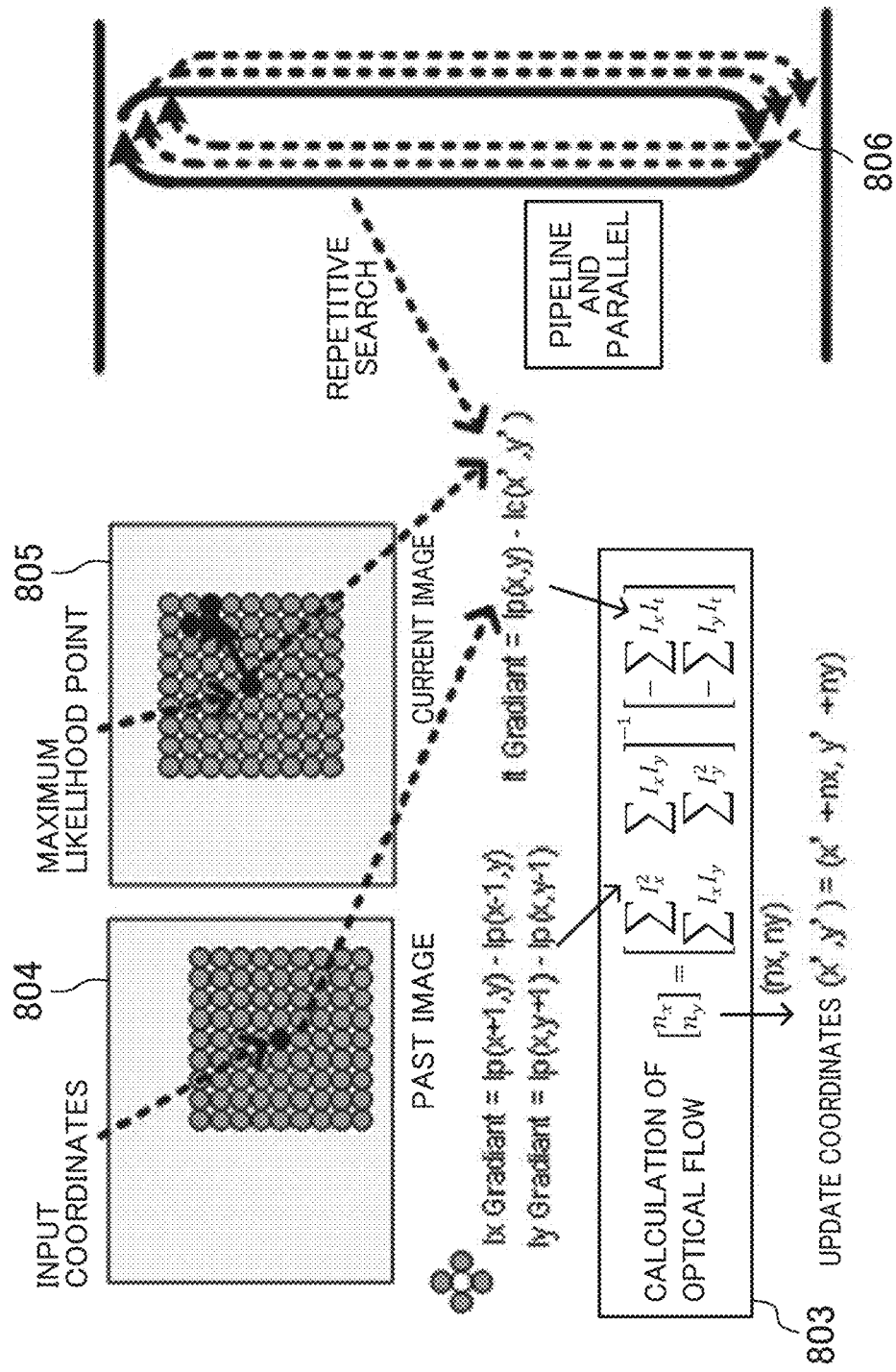

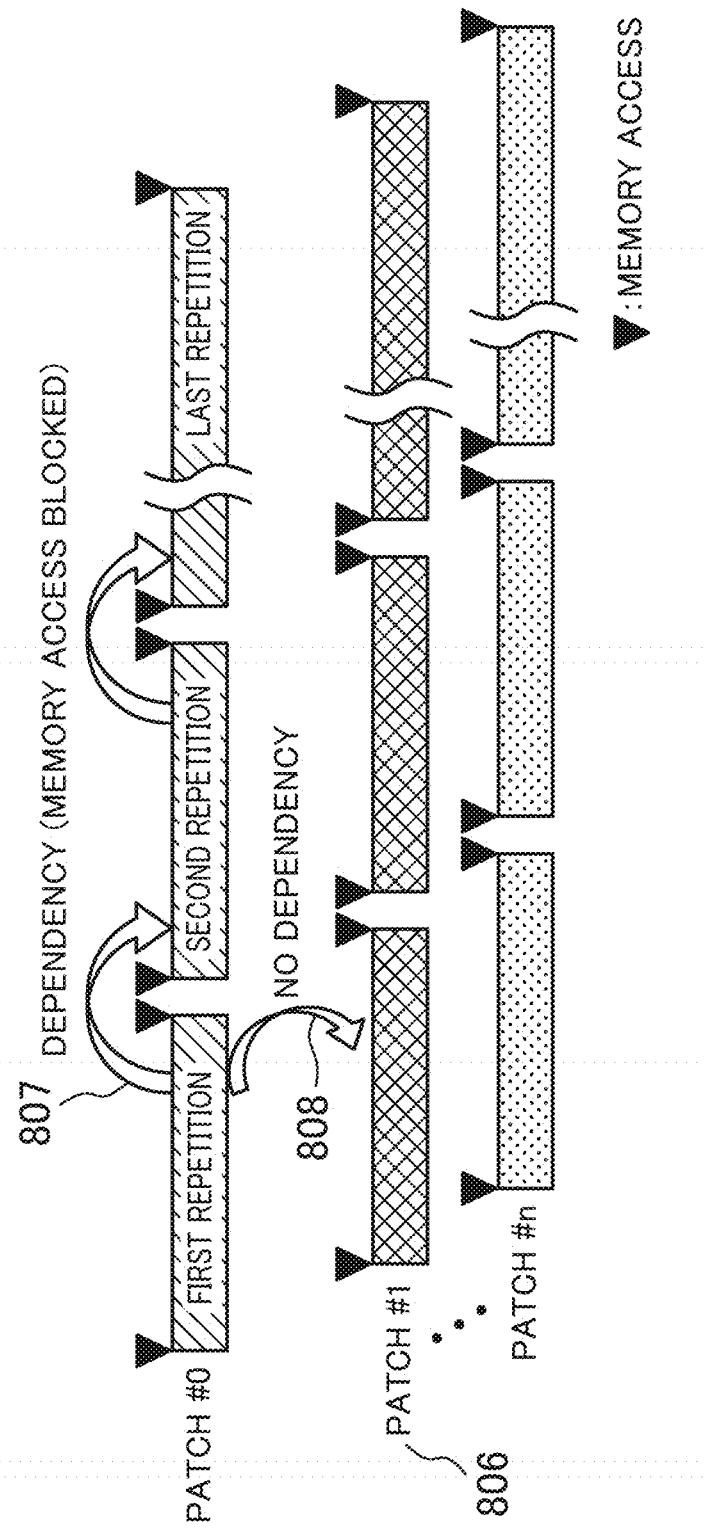

IMAGE RECOGNITION SYSTEM AND SEMICONDUCTOR INTEGRATED CIRCUIT

CROSS-REFERENCE TO RELATED APPLICATIONS

This is a continuation of International Application No. PCT/JP2015/000298 filed on Jan. 23, 2015, which claims priority to Japanese Patent Application No. 2014-035060 filed on Feb. 26, 2014. The entire disclosures of these applications are incorporated by reference herein.

BACKGROUND

The present disclosure relates to an image recognition system, and particularly relates to efficient image recognition processing.

Image recognition technologies for detecting objects such as humans and non-humans have been widely used in various devices such as monitoring cameras, vehicle safety devices, and digital still cameras. Such technologies are expected to be widely applied to, e.g., identification of a suspicious person, collection of marketing information, or risk prediction, by tracking an object and determining the type of the object's behavior.

Image recognition processing using an optical flow has been known as one of technologies for tracking an object (see, e.g., U.S. Pat. No. 8,374,393). Further, a technology for determining the orientation of a human's face using a software discriminator has been disclosed as one of image recognition processing technologies (in, e.g., U.S. Pat. No. 7,957,567). Moreover, as another image recognition processing technology using software, a technology for estimating the posture of a human based on feature quantity extraction focused on the edge of a human body has been disclosed (by, e.g., Pedro F. Felzenszwalb, Ross B. Girshick, David McAllester and Deva Ramanan, "Object Detection with Discriminatively Trained Part-Based Models," Pattern Analysis and Machine Intelligence, IEEE Transactions, Vol. 32, No. 9, pp. 1627-1645, September 2010, and Yi Yang and Deva Ramanan, "Articulated pose estimation with flexible mixtures-of-parts," Computer Vision and Pattern Recognition (CVPR), 2011 IEEE Conference, pp. 1385-1392, 20-25 Jun. 2011).

On the other hand, a reconfigurable processor implementing the image recognition processing by hardware has been known (see, e.g., Atsushi Atarashi and four other authors, "Low Power Application-Oriented Processor—taking image recognition processor IMAPCAR2 as example—," NEC Technical Journal, Vol. 62, No. 3/2009, pp. 97-101). Japanese Unexamined Patent Publications Nos. 2001-236496 and 2007-141132 also disclose reconfigurable processors. Further, since the image recognition processing requires various types of processing steps, a processor capable of executing multiple different types of computations efficiently has been known (see, e.g., Japanese Unexamined Patent Publication No. 2010-134713).

In addition, according to some technologies, such as gesture recognition processing using a Kinect sensor developed by Microsoft®, 3D data is generated by a sensor and the output of the sensor is subjected to software processing.

There are various types of image recognition processing related technologies as described above, and such technologies advance so fast. Thus, in order to make the system flexibly adaptable to the latest technology, it can be said that it is a practical choice to implement the image recognition processing by software.

SUMMARY

However, if the entire image recognition processing is implemented by software, the software may flexibly be adaptable to various types of algorithms, but a central processing unit (CPU) or any other processor needs to handle the entire processing. Therefore, either a high-performance CPU or a number of CPUs may be required in that case. This may possibly increase the overall cost, limit the processing performance, or increase the power consumption. In particular, when a high definition image is processed, the power consumption significantly increases because a high-performance CPU having high frequency or any other high-end device is indispensable.

On the other hand, if the entire image recognition processing is implemented by hardware, the processing performance may be enhanced because hardware components best suited to the respective processing steps may be used. Further, the overall cost and power consumption may be reduced because no high-performance CPU or any other high-end device is required. However, unfortunately, the system may lose the flexibility to be attained by software implementation, or the scale of the circuit may increase.

That is to say, some tradeoff is inevitable between the advantages of the software-implemented image recognition processing and those of the hardware-implemented image recognition processing.

The documents of the related art cited above merely disclose details of the image recognition processing, and are silent about an optimum system architecture developed with the tradeoff taken into consideration.

Further, in the Kinect sensor described above, there are some limits to its optical system. For example, it is difficult for the Kinect sensor to recognize the gesture of a remote object using an optical zoom function, or that of an object in a wide space using a wide-angle or fish-eye lens. Thus, the processing using software may be limited to the case where the Kinect sensor is used (such as video games).

In view of the foregoing, it is therefore an object of the present disclosure to provide an image recognition system optimized in terms of the circuit scale, power consumption, processing performance, and flexibility.

The present disclosure provides the following solution to overcome the above-described problem. That is, an image recognition system for detecting and tracking at least an image portion associated with a predefined object from a moving picture is configured to be able to perform: an object detection processing step of detecting the object from the moving picture; a tracking point specification processing step of specifying at least a predetermined point associated with the object as a tracking point; a tracking target recognition processing step of recognizing an actual tracking target based on the tracking point; a tracking processing step of tracking the tracking target; and a determination processing step of determining the type of the tracking target's behavior based on a result of the tracking processing step, and the tracking point specification processing step and the determination processing step are implemented by software, while the object detection processing step, the tracking target recognition processing step, and the tracking processing step are implemented by hardware.

Alternatively, a semiconductor integrated circuit performing a processing step of detecting and tracking at least an image portion associated with a predefined object from a moving picture includes: an object detector configured to perform a processing step of detecting the object from the moving picture, a tracking target recognizer configured to perform a processing step of recognizing at least a predetermined point associated with the object as an actual tracking target, a tracker configured to perform a processing step of tracking the tracking target, a CPU configured to perform a processing step of specifying the predetermined point, and a processing step of determining the type of the tracking target's behavior based on a result of tracking obtained by the tracker, a DMA controller configured to transfer data to the object detector, the tracking target recognizer, and the tracker, the data being required by the object detector, the tracking target recognizer, and the tracker to perform their respective processing steps, and a data bus configured to couple together the object detector, the tracking target recognizer, the tracker, the CPU, and the DMA controller.

According to the present disclosure, an object such as a human may be detected in a moving picture, and a predetermined region of the human, such as his or her hand, may be specified as a tracking point. Then, even if any other object is moving in the moving picture while the tracking point is moving, the tracking point is recognized as an actual tracking target. Thus, the trace of the target may be followed with the tracking target kept captured. Therefore, the type of the behavior of the tracking target may be determined if the trace of the tracking target is followed.

So far, researches have been conducted in various manners on the processing steps to be performed to detect an object from a moving picture and determine the type of its behavior, and technologies related to those processing steps have been advancing. Therefore, to cope with new technologies flexibly, it is practical to implement those processing steps by software.

If the entire processing is implemented by software, flexibility to the latest technology may easily be ensured, and the increase in circuit scale may be reducible. However, in order to improve the processing performance, a high-performance CPU or any other high-end device is required. As a result, the power consumption may increase, and the processing performance may be restricted because it depends on the CPU or any other high-end device.

On the other hand, if the entire processing is implemented by hardware, the processing performance may easily be improved, and the power consumption may be reducible. However, the benefits obtained by implementing the processing by software will be sacrificed instead.

Thus, to overcome such a problem, the present inventors focused our attention on providing a means for maximizing both of the benefits of the software-implemented processing and those of the hardware-implemented processing. That is, the present inventors discovered that it is the best choice to implement the tracking point specification processing step and the determination processing step by software, and implement the object detection processing step, the tracking target recognition processing step, and the tracking processing step by hardware.

Thus, the benefits of the software-implemented processing, i.e., ensured flexibility and prevention of significant increase in circuit scale, may be achieved without sacrificing the benefits of the hardware-implemented processing, i.e., reduced power consumption and improved processing speed.

The present disclosure provides an image recognition system optimized in terms of the circuit scale, power consumption, processing performance, and flexibility.

BRIEF DESCRIPTION OF THE DRAWINGS

FIG. 1 illustrates an overview of an image recognition system according to an embodiment.

FIGS. 2A and 2B are flowcharts illustrating exemplary processing steps implemented by hardware according to an embodiment.

FIG. 3 illustrates specific exemplary processing steps performed by an image recognition system according to an embodiment.

FIG. 4 illustrates a system hierarchy diagram of the exemplary processing steps shown in FIG. 3.

FIG. 8 illustrates another exemplary set of timings for the image recognition system according to the embodiment to perform the respective processing steps.

FIGS. 9A and 9B illustrate the advantages of an image recognition system according to an embodiment.

FIG. 10 illustrates an exemplary configuration for having a tracking target recognition processing step performed by an image recognition system according to an embodiment.

FIGS. 11A and 11B illustrate how the system having the configuration shown in FIG. 10 operates.

FIG. 14 illustrates details of calculation repetitively performed by an image recognition system according to an embodiment to perform the tracking processing step.

FIG. 15 is a timing chart showing when an image recognition system according to an embodiment performs calculation procedures repetitively in parallel to perform the tracking processing step.

DETAILED DESCRIPTION

Figure 5:
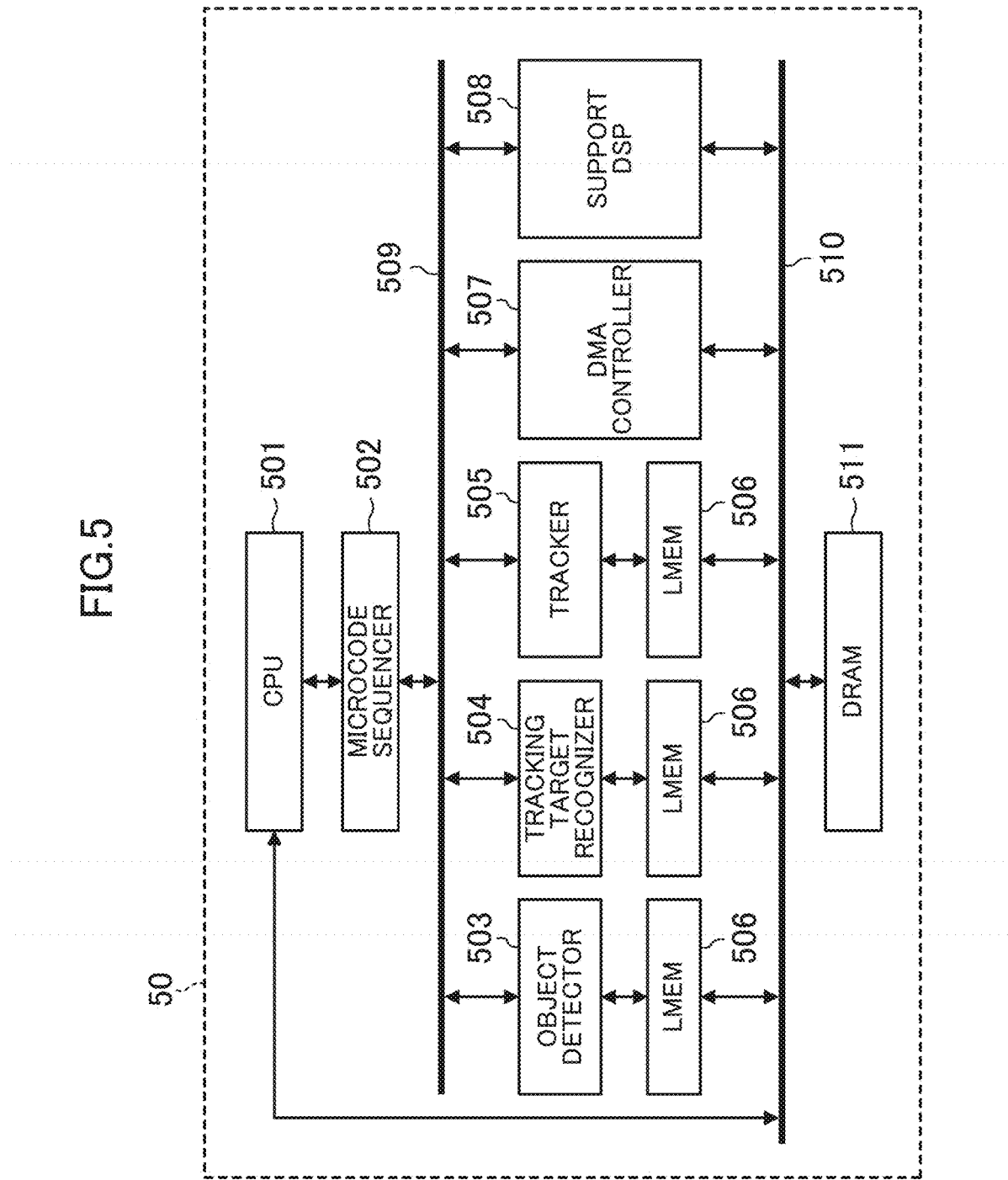
FIG. 5 illustrates a block diagram of a semiconductor integrated circuit as an exemplary implementation of the hardware shown in FIG. 4.

Embodiments of the present disclosure will now be described with reference to the drawings. In the drawings, the same reference character denotes the same component or processing step.

<Overview of Image Recognition System>

FIG. 1 illustrates an overview of an image recognition system according to an embodiment. An image recognition system 10 according to this embodiment performs image recognition processing by detecting an object captured in an input moving picture and tracking a predetermined point associated with the object so as to determine the type of the object's behavior. Then, based on a result of the behavior type determination, a suitable application is selected. The respective processing steps performed by the image recognition system 10 are implemented by software and by hardware.

Specifically, in the image recognition system 10, an object detection processing step S11, a tracking target recognition processing step S13, and a tracking processing step S14 (hereinafter respectively referred to as Processing Steps S11, S13, and S14) are implemented by hardware. On the other hand, a tracking point specification processing step S12 and a determination processing step S15 (hereinafter respectively referred to as Processing Steps S12 and S15) are implemented by software.

So far, researches have been conducted in various manners on the image recognition processing. Since the image recognition technologies are advancing rapidly lately, processing steps to be performed to detect an object and determine the type of its behavior are generally implemented by software so that the system may easily be adapted flexibly to new technologies. For example, it is known that the image recognition processing may be implemented by software with Open Source Computer Vision Library (Open CV).

If the entire processing is implemented by software, flexibility to various types of technologies may easily be increased, and significant increase in the circuit scale may be prevented more easily than in the case where the processing steps are implemented by hardware. However, improvement in performance will be limited because processing performance depends on a CPU or any other high-end device. Further, if a high performance CPU or any other high-end device is operated at high frequencies, the power consumption may also increase unintentionally.

On the other hand, if the entire processing is implemented by hardware, the processing performance may easily be improved, and the power consumption may be reducible, but the advantages to be achieved by the software implementation, such as flexibility, tend to be lost. Thus, some tradeoff is inevitable between advantages obtained by the software-implemented processing and those obtained by the hardware-implemented processing.

In view of the foregoing, the present inventors focused our attention on the following points in consideration of the tradeoff, and decided to adopt a scheme in which those processing steps are classified into the ones to be implemented by software and the ones to be implemented by hardware.

Specifically, the processing to be implemented by hardware should be:

(1) already used generally even though it lacks the flexibility that would be obtained by the software-implemented processing; and (2) result in essentially higher efficiency than in a situation where the same processing is implemented by software.

Thus, the present inventors presumed that the system configuration of the image recognition system 10 may be optimized if the processing steps satisfying these two requirements are implemented by hardware.

In Processing Step S11, a human, for example, is detected as an object captured in a moving picture. In Processing Step S11, the image data of an input moving picture is searched to determine whether or not an image of the object previously machine-learned is included in the image data. The object does not have to be a human, but may be anything else as long as it can be defined in advance by learning.

As used herein, the "mechanical learning" refers to general supervised mechanical learning. The mechanical learning may be carried out in the following manner. For example, from a group of images representing an object and non-objects, correspondence between feature quantities obtained from the images (e.g., histograms of oriented gradients (HOG) and local binary patterns (LBP)) and the label (i.e., the object or non-objects) is obtained. Then, statistical processing is performed on the correspondence thus obtained to isolate a set indicating the object from all combinations of the feature quantities.

Thus, Processing Step S11 may be implemented as a common detection processing step performed by a discriminator detector which searches every pixel in a moving picture using the previously machine-learned image data. The object may be a human's face, or at least some part of a human.

In this manner, Processing Step S11 is repeated on every pixel. Thus, it is recommended that this processing step be implemented by hardware rather than by software in order to speed up the processing. Data for learning about the object may be stored in a memory or any other storage.

In Processing Step S12, a predetermined point of the object detected in Processing Step S11, e.g., a hand or a face, is specified as a tracking point. The tracking point may be at least a portion associated with the object or the entire object. Further, a plurality of points of the object, e.g., both hands, may also be specified as a plurality of tracking points. In Processing Step S12, just like face recognition processing, for example, a predetermined point of the object (e.g., face) may or may not be specified as the tracking point depending on whether the predetermined point is present in the image data or not.

If a human's face has been detected as the object in Processing Step S11, his or her hand may be specified as the tracking point on the premise that the presence of the human's face indicates the presence of a human in the moving picture. That is, the tracking point is not always a portion of the object, but may be a portion which is expected to be present based on the presence of the object.

Thus, Processing Step S12 may be implemented as various types of processing, such as face recognition processing. Since technologies related to such processing advance rapidly, it is recommended that this processing step be implemented by software so as to be adapted flexibly to the rapidly advancing technologies.

In Processing Step S13, a tracking target to be actually tracked by the image recognition system 10 is recognized based on the point specified in Processing Step S12. In Processing Step S13, the image data is searched to determine whether an image (texture) of the previously specified particular point, e.g., a human's hand, is included in the image data or not. If such an image is included, it means that the tracking target has been recognized successfully. When Processing Step S13 is performed, learning and detection of the texture are performed in parallel, and the result of texture learning is reflected in the texture detection to be performed sequentially and repeatedly. Thus, even if the shape of the tracking target is sensed to have changed, e.g., fingers of the hand are bent or stretched, during Processing Step S13, the tracking target may still be recognized continuously.

In this manner, in Processing Step S13, the processing step of searching the image data for the previously specified texture, and the processing step of learning about the sequentially changing texture are performed repeatedly. Thus, this Processing Step S13 needs to be performed at high speeds in view of the performance. On the other hand, these processing steps may be implemented as common detection processing steps using a discriminator detector. Therefore, it is recommended that Processing Step S13 be implemented by hardware. Note that the result of the sequential learning of the texture is stored in a memory or any other suitable storage.

In Processing Step S14, the tracking target recognized in Processing Step S13 is tracked. Further, in Processing Step S14, data about the tracking target being currently tracked can be fed back to Processing Step S13, and this feedback enables the sequential learning in Processing Step S13. In one implementation of Processing Step S14, a motion vector (optical or motion flow) of an image (texture) at an arbitrary point in the image data may be calculated by, for example, the Lucas-Kanade method for optical flow estimation.

Thus, Processing Step S14 may be implemented by a common technique such as optical flow. Therefore, it is recommended that Processing Step S14 be implemented by hardware so as to improve the performance easily, e.g., to increase the processing speed.

In Processing Step S15, the type of the behavior of the tracking target is determined based on the result of tracking of the tracking target in Processing Step S14.

Processing Step S15 needs to be flexibly adapted to various types of objects in order to determine the type of the behavior of the tracking target. For example, if the image recognition system 10 is applied to a vehicle safety device, a determination may be made whether or not the behavior of a driver (or a driver's face) as the tracking target matches a pattern of inattentive driving. Further, if the image recognition system 10 is applied to a monitoring camera in a shop, a determination may be made which one of items on the shelf the shopper has reached for.

On top of that, various researches have been conducted on the techniques for determining the type of behavior. Taking future technical trends into account, it is recommended that the techniques for determining the type of behavior be flexibly adapted to the latest technology.

Therefore, it is recommended that Processing Step S15 be implemented by software.

As can be seen from the foregoing, the processing steps shown in FIG. 1 cooperate with each other to realize the image recognition system 10 according to the present embodiment.

FIGS. 2A and 2B are flowcharts illustrating exemplary processing steps implemented by hardware according to an embodiment. FIG. 2A illustrates an overview of exemplary object detection processing step and tracking target recognition processing step, and FIG. 2B illustrates an overview of an exemplary tracking processing step.

If Processing Steps S11, S13, and S14 are each implemented by hardware components, the combination of the hardware components may be changed adaptively to variations required for each of these processing steps.

Specifically, based on pixel data included in a region of interest (ROI) in image data 20, a feature quantity of an edge portion of the object is generated (in S21). A predetermined formula may be used to generate the feature quantity, and the combination of the hardware components may be adapted to variations, such as the position of the reference pixel and parameters used in the formula.

When the feature quantity is generated, a look-up table (LUT) in which indices representing those feature quantities and scores indicating the degrees of probability (likelihood) are associated with each other is searched to determine the scores corresponding to the indices (S22). The LUT may be stored in a static random access memory (SRAM), for example, and its values may be updated sequentially. Updating the contents of the LUT may be hereinafter referred to as "learning." Thus, the hardware components may be adapted to the contents of the LUT as variations.

The scores obtained from the LUT are accumulated, and the cumulative total value thus obtained and a threshold value are compared to determine the object and the tracking target (S23). In this processing step, the hardware components may be adapted to variations, such as the number of times of accumulation of the scores and the threshold. In the LUT, the feature quantities and the scores are stored in advance by mechanical learning, for example.

As can be seen from the foregoing, these processing steps are implemented as general ones, and may be implemented easily by hardware even though the hardware-implemented processing lacks the flexibility to be attained by software-implemented processing. Thus, the hardware components may be configured to be adaptable to the variations described above.

On the other hand, FIG. 2B illustrates an exemplary Processing Step S14 using the LK method for optical flow.

In the optical flow, a luminance gradient is generated based on the pixel data included in the ROI region of the image data 20 (in S24). The formula for generating the luminance gradient is stationary.

Then, based on the luminance gradient thus generated, a flow quantity indicating coordinate displacement (e.g., motion vector) is calculated by flow matrix calculation (S25). The formula for calculating the flow quantity is stationary.

Based on the flow quantity thus calculated, a determination is made whether the motion of the tracking target has converged or not, and the flow quantity at the time when the motion converges (to where the tracking target has moved) is output (S26). Thus, the hardware components may be adapted to variations, such as the conditions for determining whether the motion has converged or not.

In this way, Processing Steps S24-S26 are performed repetitively in the optical flow. Therefore, in order to speed up the processing, it is highly beneficial that these processing steps are implemented by hardware.

FIG. 3 illustrates specific processing steps performed by an image recognition system according to an embodiment. In the example shown in FIG. 3, the object is a human, and the tracking target is his hands.

If the human 31 is captured in an image 30 of an input moving picture at any arbitrary time, the system detects the human 31 as the object in Processing Step S11.

When the human 31 is detected, hands 32, 33 of the human 31 are specified as tracking points in Processing Step S12. Alternatively, only a single hand 32 may be specified as a single tracking point.

When the hands 32, 33 are specified, recognition and tracking of the hands 32, 33 are sequentially performed in parallel in Processing Steps S13 and S14. Thus, even if the shape of the hands 32, 33 has changed or if any object that resembles the shape of the hand is present, the system may track the hands 32, 33 as actual tracking targets while sequentially learning about the tracking targets.

As Processing Steps S11 and S13, Processing Steps S21-S23 shown in FIG. 2A are performed. Further, as Processing Step S14, Processing Steps S24-S26 shown in FIG. 2B are performed.

Thereafter, when the hands 32, 33 are tracked for a predetermined time, for example, the type of the behavior of the hands 32, 33 is determined in Processing Step S15. Processing Step S15 may be performed when a predetermined amount of time passes since the movement of the hands 32, 33 stopped. Through these processing steps, the human's gesture may be recognized.

Then, based on the result of the determination in Processing Step S15, a determination is made in Processing Step S16 how an application needs to run in accordance with the type of the behavior of the hands 32, 33. Note that an arbitrary application is selected based on the operation results of the image recognition system 10 of the present embodiment. For example, if the image recognition system 10 is applied to a vehicle safety device, and if the result of the behavior type determination matches a pattern of inattentive driving of a driver, an application that calls the driver's attention may be started.

In this way, Processing Steps S11-S16 are repeated. Optionally, Processing Steps S13, S14 may be performed again after Processing Step S15. Further, if the objects or the tracking targets are changed during these Processing Steps S11-S15, the processing steps may be performed again in response to the change.

FIG. 4 illustrates a system hierarchy diagram of the processing steps shown in FIG. 3.

As shown in FIG. 4, for example, Processing Steps S11, S13, and S14 are implemented by hardware components 50, and Processing Step S12 and S15 are implemented by middleware 53 which is a type of software.

Processing Steps S11, S13, and S14 and Processing Steps S12 and S15 are linked with each other via a driver 51 and an application programming interface (API) 52. Further, Processing Step S16 is implemented by an application 54 suitable for its intended processing.

As can be seen, according to this embodiment, the hardware-implemented processing and the software-implemented processing cooperate with each other in this manner. Therefore, the software-implemented processing may ensure sustained flexibility and prevent a significant increase in circuit scale, while at the same time, the hardware-implemented processing may improve the performance and reduce the power consumption.

<Configuration for Semiconductor Integrated Circuit>

FIG. 5 is a block diagram illustrating a semiconductor integrated circuit as an exemplary implementation of the hardware shown in FIG. 4. This set of hardware components operates as a semiconductor integrated circuit 50 capable of performing the above-described image recognition processing, and includes a CPU 501, a microcode sequencer 502, an object detector 503, a tracking target recognizer 504, a tracker 505, LMEMs 506 which are a plurality of local memories respectively provided for the blocks 503, 504 and 505, a direct memory access (DMA) controller 507, a support digital signal processor (DSP) 508, a control bus 509, a data bus 510, and a dynamic random access memory (DRAM) 511.

The CPU 501, the microcode sequencer 502, the object detector 503, the tracking target recognizer 504, the tracker 505, the DMA controller 507, and the support DSP 508 are all connected to the data bus 510.

The CPU 501 acquires necessary data from the DRAM 511 through the data bus 510 to perform Processing Steps S12, S15, and S16. Further, the CPU 501 is called by the API shown in FIG. 4, accesses the microcode sequencer 502, enters the results of Processing Steps S12 and S15 and the data acquired through the data bus 510 to the microcode sequencer 502, and controls the operation of the microcode sequencer 502 with microcodes.

The microcode sequencer 502 is connected to the object detector 503, the tracking target recognizer 504, the tracker 505, the DMA controller 507, and the support DSP 508 through the control bus 509.

Further, the microcode sequencer 502 controls the operation of each of the object detector 503, the tracking target recognizer 504, the tracker 505, the DMA controller 507, and the support DSP 508 in accordance with the microcodes.

As a result, the control of the operation of each of the object detector 503, the tracking target recognizer 504, the tracker 505, the DMA controller 507, and the support DSP 508 by the CPU 501 is relayed via the microcode sequencer 502.

The object detector 503, the tracking target recognizer 504, the tracker 505, the DMA controller 507, and the support DSP 508 are activated under the operation control of the microcode sequencer 502. At this time, parameters required for respective Processing Steps S11, S13, and S14 are set. When activated, the object detector 503, the tracking target recognizer 504, the tracker 505, the DMA controller 507, and the support DSP 508 perform their own processing steps, and thus, the operation control by the CPU 501 is not necessary for a predetermined period of time.

The object detector 503 accesses its associated LMEM 506 in accordance with the control by the microcode sequencer 502 to perform Processing Step S11.

The tracking target recognizer 504 accesses its associated LMEM 506 in accordance with the control by the microcode sequencer 502 to perform Processing Step S13.

The tracker 505 accesses its associated LMEM 506 in accordance with the control by the microcode sequencer 502 to perform Processing Step S14.

The results of Processing Steps S11, S13, and S14 are stored in the DRAM 511 through their associated LMEMs 506 and the data bus 510.

The DMA controller 507 reads data items required for Processing Steps S11, S13, and S14 from the DRAM 511 to transfer the data items to the respective LMEMs 506 concurrently and in parallel with each other. Since Processing Steps S11, S13, and S14 are implemented by hardware, the DMA controller 507 may estimate easily the addresses to be accessed in the DRAM 511. Thus, the DMA controller 507 may transfer the data items from the DRAM 511 to the respective LMEMs 506 in parallel. This may prevent significant reduction in performance caused by direct access to the DRAM 511 attempted by the object detector 503, the tracking target recognizer 504, and the tracker 505.

The support DSP 508 performs additional processing steps related to the object detector 503, the tracking target recognizer 504, and the tracker 505. This may prevent significant decrease in flexibility when Processing Steps S11, S13, and S14 are implemented by hardware. The support DSP 508 is able to perform, for example, preprocessing for Processing Steps S11, S13, and S14, or correction to the processing results. Further, the support DSP 508 may support cooperation between Processing Steps S11, S13, and S14, and the processing steps to be performed by the CPU 501.

Since Processing Steps S12, S15, and S16 are performed by the CPU 501, and Processing Steps S11, S13, and S14 are implemented by their associated hardware components, high-performance image recognition processing may be performed at high speeds with the load on the CPU 501 lightened.

<Exemplary Operation of Semiconductor Integrated Circuit>

Figure 6:
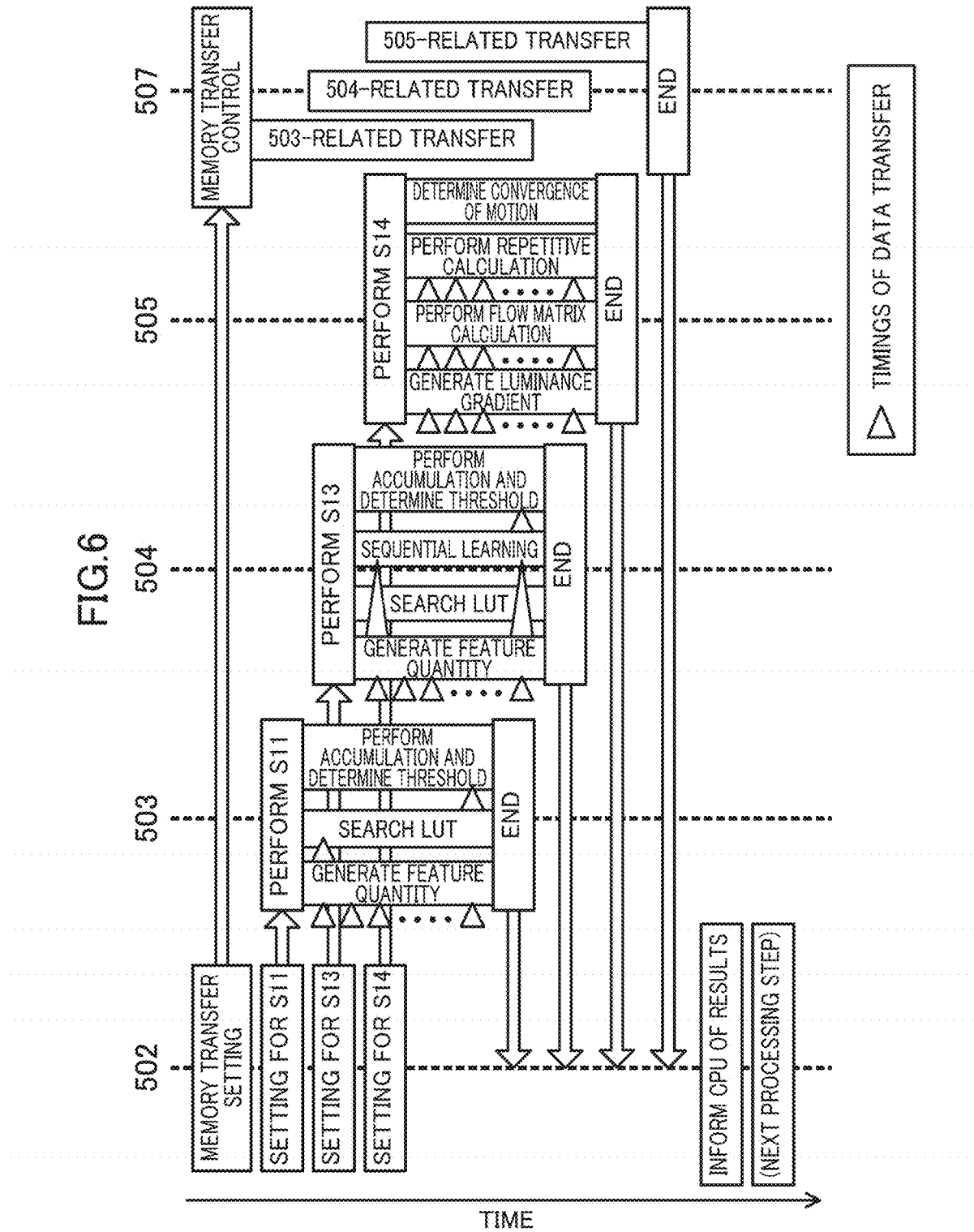
FIG. 6 illustrates an exemplary data transfer in a semiconductor integrated circuit according to an embodiment.

FIG. 6 illustrates an exemplary data transfer operation in a semiconductor integrated circuit according to an embodiment. The ordinate represents time, and the abscissa represents processing steps performed by the respective hardware components.

The data transfer operation by the DMA controller 507 will be described below. The open triangles shown in FIG. 6 indicate timings of data transfer by the DMA controller 507.

As shown in FIG. 6, the object detector 503, the tracking target recognizer 504, the tracker 505, and the DMA controller 507 may operate in parallel when the microcode sequencer 502 enters settings required for these components 503, 504, 505 and 507 to perform their respective processing steps.

First, the microcode sequencer 502 makes the DMA controller 507 ready to transfer data or any other information required for the object detector 503, the tracking target recognizer 504, and the tracker 505 to perform their processing steps by from the DRAM 511 (memory transfer setting). Thus, the DMA controller 507 performs memory transfer control for transferring data from the DRAM 511 to the LMEMs 506, and starts transferring data required for Processing Step S11 to associated one of the LMEMs 506 (503-related transfer).

The DMA controller 507 has independent channels, e.g., 3 channels provided for each of the processing steps to be performed by the object detector 503, the tracking target recognizer 504, and the tracker 505 (i.e., 9 channels in total).

The microcode sequencer 502 enters settings related to Processing Step S11 to the object detector 503 (setting for S11). In response, the object detector 503 performs Processing Step S11.

Specifically, data transfer between the object detector 403 and the LMEM 506 is allowed every time the object detector 503 performs a feature quantity generating processing step (Processing Step S21 shown in FIG. 2A). Further, when an LUT searching processing step (Processing Step S22 shown in FIG. 2A) is performed, data is transferred once at the start of Processing Step S22. Moreover, when an accumulation/threshold determination processing step (Processing Step S23 shown in FIG. 2A) is performed, data is transferred once at the last stage of Processing Step S23. Thus, data may be transferred independently in the respective processing steps.

The DMA controller 507 starts transferring data required for Processing Step S13 to the LMEM 506 (504-related transfer).

Then, the microcode sequencer 502 enters settings related to Processing Step S13 to the tracking target recognizer 504 (setting for S13). In response, the tracking target recognizer 504 performs Processing Step S13. As Processing Step S13, Processing Steps S21-S23 shown in FIG. 2A are performed. At this time, sequential learning is performed in parallel, i.e., the contents of the LUT are updated sequentially.

Further, the DMA controller 507 starts transferring data required for Processing Step S14 to the LMEM 506 (505-related transfer).

Then, the microcode sequencer 502 enters settings related to Processing Step S14 to the tracker 505 (setting for S14). In response, the tracker 505 performs Processing Step S14. As Processing Step S14, Processing Steps S24-S26 shown in FIG. 2B are performed.

Thereafter, when the object detector 503, the tracking target recognizer 504, the tracker 505, and the DMA controller 507 finish their respective processing steps, the CPU 501 is informed of the processing results, and then the same set of processing steps will be performed repeatedly.

Thus, in each of Processing Steps S11, S13, and S14, the DMA controller 507 transfers data independently at the timings indicated by the open triangles shown in FIG. 6.

Note that two or more processing steps may be performed in parallel and in cooperation with each other according to the details of their processing. In that case, these processing steps may be performed concurrently while the data is being transferred via the DMA controller as described above. Alternatively, the processing steps may also be performed sequentially in a pipeline fashion with the result of a single processing step once stored in the DRAM 511, and then transferred again to the LMEM 506.

The order of setting entry shown in FIG. 6, i.e., the order of the respective processing steps, is not limited to the one shown in FIG. 6 as long as each of Processing Steps S11, S13, and S14 is started to have enough time to finish within a predetermined amount of time, and as long as the cooperating processing steps are performed simultaneously at appropriate timing within the predetermined amount of time.

The DMA controller 507 may provide an arbitrary number of channels for each of the processing steps. The number of channels provided for one processing step may be different from that of channels provided for another depending on the details of the processing steps. The total number of channels is not limited to nine.

Figure 7:
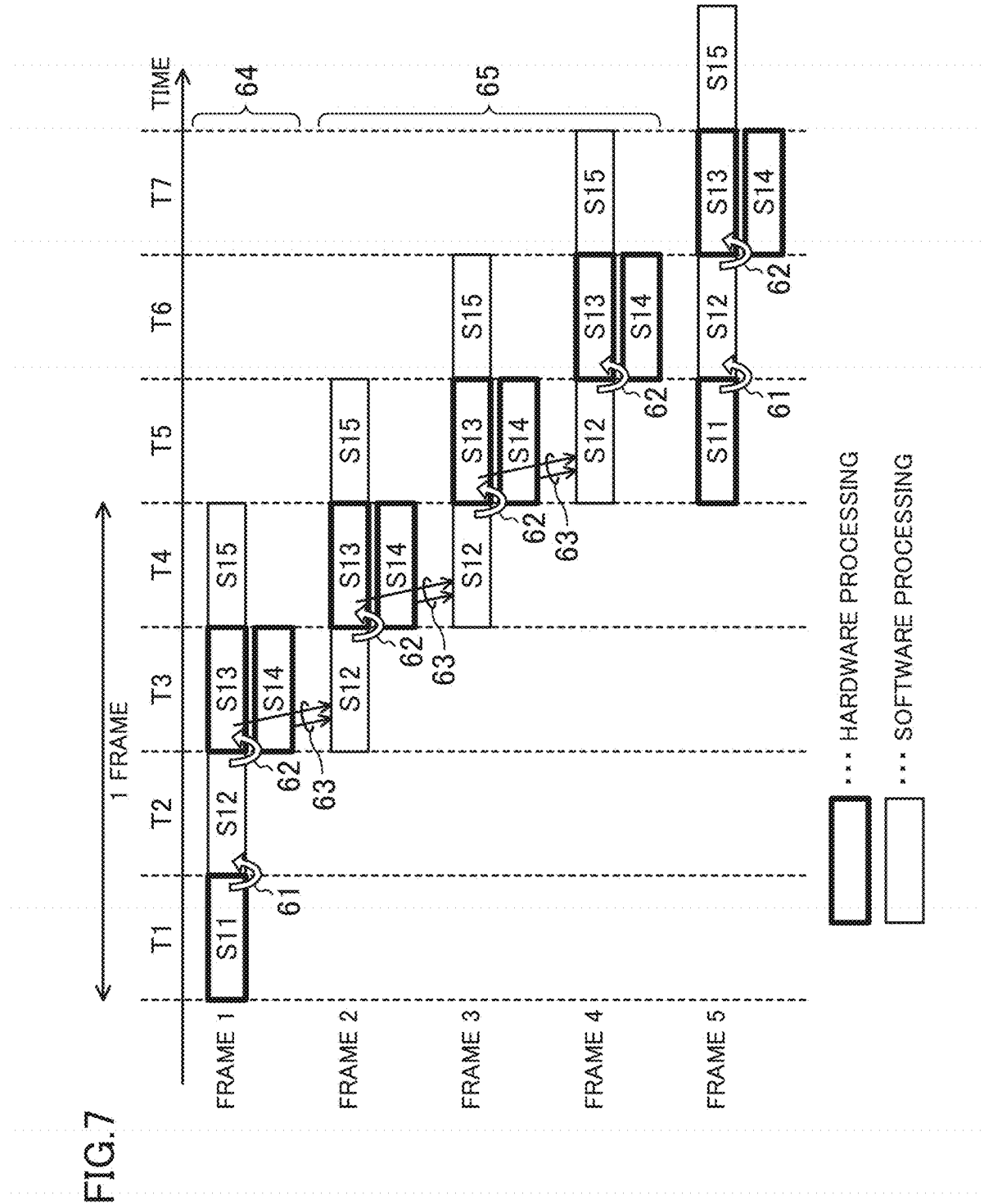
FIG. 7 illustrates an exemplary set of timings for an image recognition system according to an embodiment to perform the respective processing steps.

FIG. 7 illustrates an exemplary set of timings for an image recognition system according to an embodiment to perform the respective processing steps. Specifically, FIG. 7 illustrates an exemplary set of operation timings when image data (frame data) is processed continuously through Processing Steps S11-S15 shown in FIG. 4. In FIG. 7, the abscissa represents time, and the ordinate represents frame data items to be processed.

In unit time T1, Processing Step S11 is performed on Frame 1. Information 61 about the coordinates of an object (e.g., a human's face) on Frame 1 obtained as a result of Processing Step S11 is passed to the CPU 501 via the data bus 510.

In unit time T2, the CPU 501 performs Processing Step S12 based on the coordinate information 61 to specify a tracking point (e.g., a human's hand). Information 62 about the coordinates of the tracking point on Frame 1 obtained as a result of Processing Step S12 is passed to the tracking target recognizer 504 which performs Processing Step S13 through the API 52 and the CPU 501.

In unit time T3, Processing Steps S13 and S14 are performed in parallel based on the coordinate information 62. Further, during Processing Steps S13, S14, information 63 to be used in Processing Step S12 performed on Frame 2 is calculated as a corrected version of the information 62. That is, the information 63 is obtained as a corrected version of the coordinate information of the tracking point obtained as a result of Processing Step S12 performed on a single frame. Then, the information 63 is reflected on Processing Step S12 performed on Frame 2 in parallel in unit time T3. Note that the exchange of data within the same unit time is carried out as a DMA transfer by the DMA controller 507.

The result of Processing Step S12 performed on Frame 2 based on the information 63 is passed to the tracking target recognizer 504 that performs Processing Step S13. Thus, in Processing Step S13, sequential learning is performed with the contents of the LUT updated.

In unit time T4, the CPU 501 performs Processing Step S15 based on the results of the processing steps that have been done up to unit time T3 to determine the behavior of the tracking target. In this manner, in unit times T1-T4, the results of determination of the tracking target's behavior type with respect to Frame 1 are obtained.

Further, in unit time T4, Processing Steps S13 and S14 with respect to Frame 2 are performed concurrently.

After that, Processing Steps S12-S15 will be repeatedly performed in a pipeline fashion, and the behavior type determination will be performed on a frame-by-frame basis.

In unit time T5, Processing Step S11 is performed again on Frame 5. In this unit time, Processing Step S11 is performed concurrently with Processing Steps S12-S15 on Frames 2-4.

After that, a group 64 of processing steps and a group 65 of processing steps will be performed repeatedly to obtain the results of the behavior type determination on a frame-by-frame basis. In the group 64 of processing steps, Processing Steps S11-S15 are performed by reference to the pieces of coordinate information 61, 62. In the group 65 of processing steps, on the other hand, Processing Steps S12-S15 are performed by reference to the piece of information 63 that is a corrected version of the piece of coordinate information 62.

Control of the timings to perform the respective processing steps as described above allows the hardware components to perform Processing Steps S13 and S14 concurrently during unit times T3, T4, T6, and T7, and to perform Processing Steps S11, S13, and S14 concurrently during unit time T5. That is, two or more processing steps may be performed during a single unit time.

In FIG. 7, Processing Step S11 is performed every four unit times. However, Processing Step S11 may be performed at any arbitrary interval.

Further, FIG. 7, two or more processing steps are performed in the same unit time. However, as shown in FIG. 8, each of Processing Steps S11-S15 may be performed on a frame-by-frame basis within a single unit time.

FIG. 8 illustrates another exemplary set of timings for an image recognition system according to an embodiment to perform the respective process steps. Even if Processing Steps S11-S15 are performed at the respective timings shown in FIG. 8, Processing Steps S11, S13, and S14 may be performed concurrently by hardware components in, for example, unit time T5. Thus, the processing may also be speeded up.

FIGS. 9A and 9B illustrate the advantages of an image recognition system according to an embodiment. FIG. 9A illustrates a situation where the entire image recognition processing is implemented by software, and FIG. 9B illustrates a situation where the image recognition processing is implemented by the image recognition system according to this embodiment.

As shown in FIG. 9A, if the entire image recognition processing is implemented by software, that is, if Processing Steps S11-S15 described above are all implemented by software, data items about the ROI region included in the image data 20 are read one by one sequentially, and the CPU performs, on the data items thus read, computational processing steps for the purposes of detection of an object, specification and tracking of a tracking point, and determination of a behavior type. In FIG. 9A, these computational processing steps are labeled as computations A-X.

At this time, the CPU uses the result of the preceding computation to perform the current computation. Specifically, the CPU uses the result of the computation A to perform the computation B. Thus, the processing speed cannot be increased beyond a certain limit. When the computation X, which is the last stage, ends, the processing results with respect to a single ROI region are output, and a processing step of determining an address for reading data about another ROI region is performed.

Thus, if all the processing steps to be performed by the image recognition system 10 are implemented by software, the CPU needs to make random access to data or perform various computations repeatedly. In addition, a processing step of determining an address to access also needs to be performed. In particular, most of the processing steps shown in FIGS. 2A and 2B are repetitive ones. Thus, even if a high-performance CPU or any other high-end device is used, the processing speed cannot be increased beyond a certain limit by software-implemented processing. For example, if a high-definition (HD) moving picture, such as a full high-definition (HD) moving picture, is processed at a frame rate of 30 fps or more, it is difficult to finish image recognition processing within 33 ms only by means of software.

On the other hand, as shown in FIG. 9B, according to the image recognition system 10 of the present embodiment, the DMA controller 507 is able to predict the addresses of data items about a plurality of ROI regions. Thus, required data items may be transferred concurrently and in parallel to the respective LMEMs 506 associated with Processing Steps S11, S13, and S14.

When data is transferred to the respective LMEMs 506, Processing Steps S11, S13, and S14 are performed independently and in parallel with each other, and the results of the processing steps performed in parallel may be output. Thus, the processing may be performed at high speeds.

Thus, according to the present embodiment, Processing Steps S12 and S15 are performed by software, and Processing Steps S11, S13, and S14 are performed by hardware. Thus, even if a high definition moving picture such as a full HD moving picture is processed, the image recognition processing may be finished within 33 ms. That is, as compared with the situation illustrated in FIG. 9A, the running time of the image recognition processing may be shortened to ⅓₀ or less.

As can be seen from the foregoing, according to the image recognition system and semiconductor integrated circuit 50 of the present embodiment, Processing Steps S12 and S15 are implemented by software, and Processing Steps S11, S13, and S14 are implemented by exclusive hardware components. That is, the processing steps to be performed by the image recognition system 10 are not simply classified into those implemented by software and those implemented by hardware, but instead, the processing steps are allocated in view of the above-described conditions (1) and (2). As a result, the benefits of the software-implemented processing steps such as ensured flexibility and prevention of significant increase in circuit scale, and the benefits of the hardware-implemented processing steps such as reduced power consumption and costs, and improved processing performance are both enjoyed.

Thus, according to the present embodiment, the image recognition system 10 and the semiconductor integrated circuit 50 may be optimized in terms of circuit scale, power consumption, processing performance, and flexibility.

Finally, a detailed example of the tracking target recognition processing step S13 and the tracking processing step S14 will be described below.

FIG. 10 illustrates an exemplary configuration for allowing an image recognition system according to an embodiment to perform the tracking target recognition processing step S13. FIGS. 11A and 11B illustrate how the configuration shown in FIG. 10 operates.

The configuration shown in FIG. 10 includes an image integration unit 701, an integrated value selection unit 702, a posterior event memory 703, and a score calculation unit 704. As used herein, the "image integration" refers to calculation of a total value of pixel levels in an arbitrary rectangular area in an image (see FIG. 11A). Specifically, an integrated image obtained by integrating a given image in a two-dimensional direction is stored in advance, and integrated image values at four points of an arbitrary rectangle are extracted by the selection unit 702, thereby obtaining a total value of the pixel levels in the arbitrary rectangular area (see FIG. 11B).

The posterior event refers to the number of events corresponding to a particular pattern of feature quantities generated based on an image integrated value to be described later. Specifically, to obtain the posterior event, the number of events is stored in each of multiple storage elements of a memory array that use numerical representations of the feature quantities as indices. There are two types of number of events, namely, a (p: positive) number of events in a correct image and an (n: negative) number of events in an incorrect image, and the particular values p and n (+p and +n in FIG. 10) are accumulated respectively in a sequential learning process to be described later.

Score calculation refers to calculating, based on the above-described posterior event values, the likelihood of obtaining a correct image that matches the feature quantities. For example, the score calculation may be made by the following equation:

Score=$p/(p+n)$ where p and n represent posterior event values.

Figure 12:
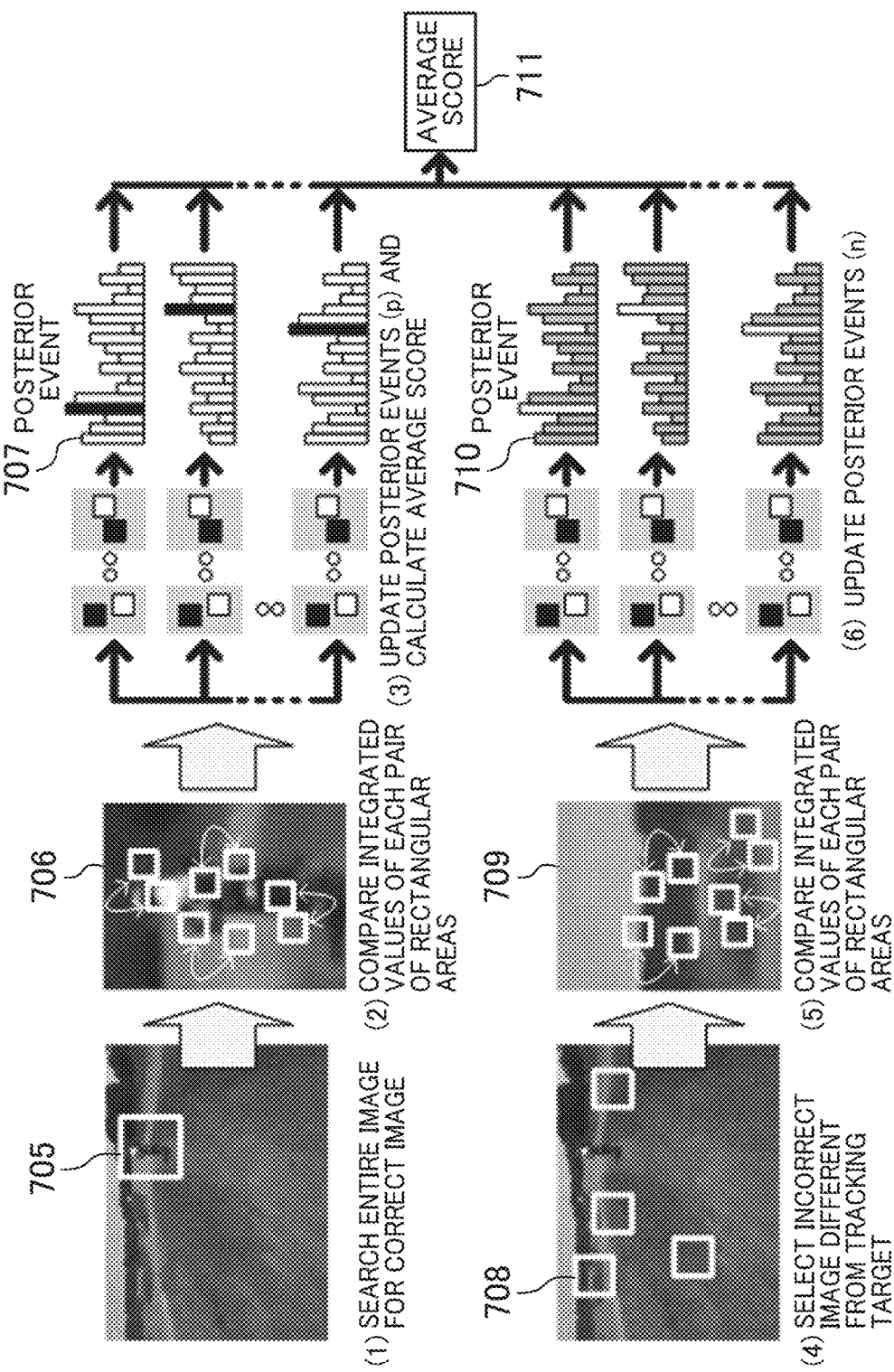
FIG. 12 illustrates a tracking target recognition processing step performed by the system with the configuration shown in FIG. 10.

FIG. 12 illustrates how the tracking target recognition processing step S13 is performed by the configuration shown in FIG. 10. Here, a sequential learning process will be described. As indicated by the reference character 705, the entire image is searched for a correct image. The correct image may be located through the selection of an image having high likelihood based on the above-described score values, and by reference to the location of the correct image estimated from a time series obtained as a result of the tracking processing step S14. In this correct image, a plurality of pairs of rectangular areas are determined either at random or in accordance with a particular rule, and the result of comparison between integrated values of each pair of rectangular areas is regarded as a 1-bit feature quantity. Since multiple bits of feature quantities are obtained from the plurality of pairs of rectangular regions, the posterior events (p) relative to the particular pattern may be defined as indicated by the reference character 707 with these feature quantities used as indices.

An image that has not turned out to be such a correct image as a result of the search of the entire image is defined as an incorrect image, and the feature quantities obtained from a plurality of pairs of rectangular areas may be defined as posterior events (n) in the incorrect image as indicated by the reference characters 708, 709, and 710.

After the calculation of these posterior events, the above-described particular values p and n are accumulated to update the posterior event memory 703.

Further, the posterior events thus calculated may be used to calculate the likelihood as score values as indicated by the reference character 704, for example, or may also be used as an average score value as indicated by the reference character 711.

Figure 13:
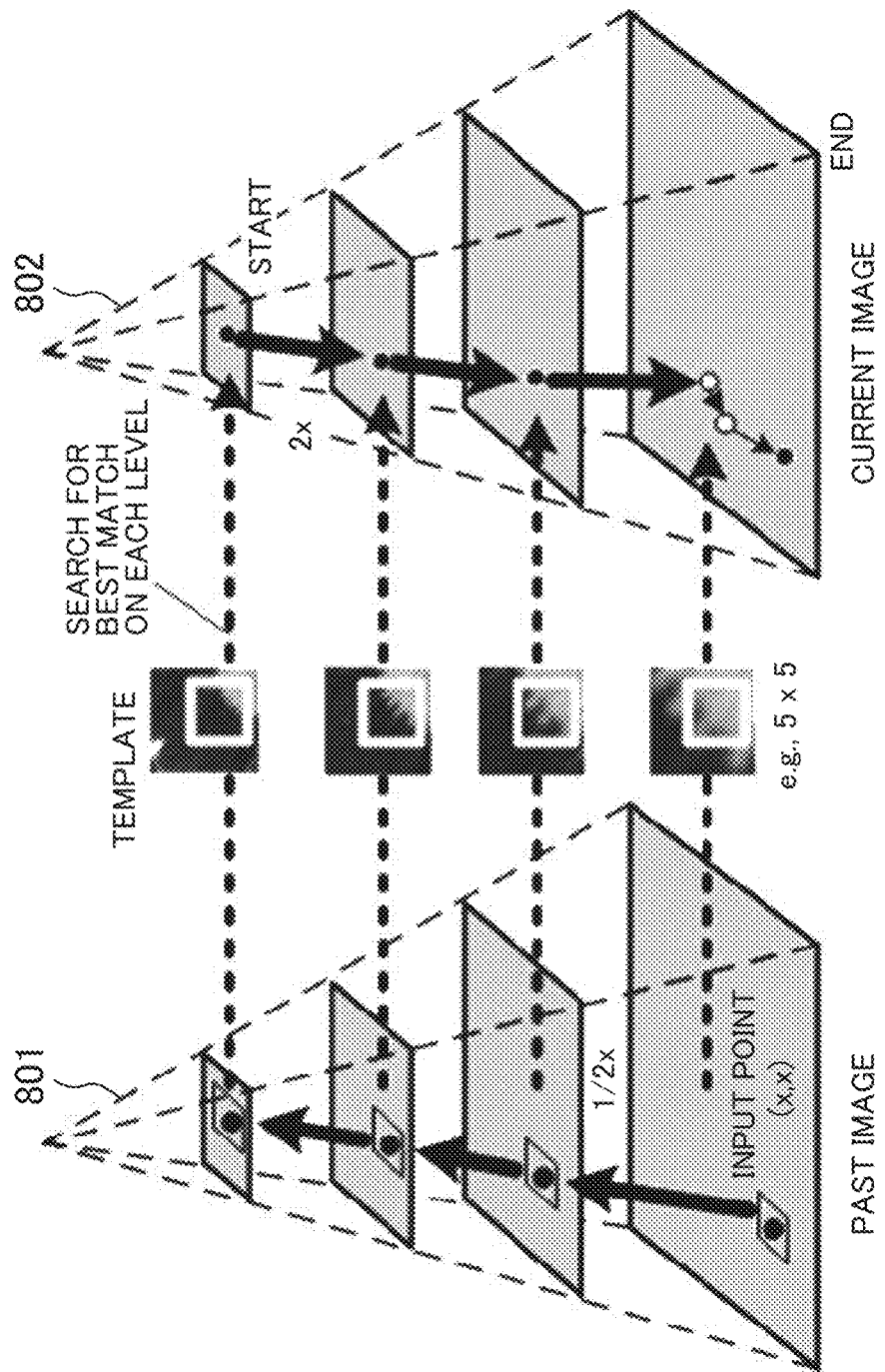
FIG. 13 is a conceptual diagram illustrating a search flow performed by an image recognition system according to an embodiment using image pyramids for a tracking processing step.

Next, referring to FIGS. 13, 14 and 15, a specific example of the tracking processing step S14 will be described below. FIG. 13 is a conceptual diagram illustrating a search flow, FIG. 14 illustrates the details of calculation, and FIG. 15 is a timing chart of the calculation.

Now, processing using the generally known Lucas-Kanade method will be described below. In the tracking processing step S14, two images in a time series (past and current images) are referred to. First, as indicated by the reference characters 801 and 802 in FIG. 13, image pyramids, each including a plurality of sequentially reduced images (reduced by ½ in this embodiment), are generated. Feature point search to be described later is performed first on the smallest image layer, and then is successively performed on the next smallest image layer and so on. This is conceptually equivalent to starting with a global search and then continuing the search of more and more detailed images while increasing the resolution step by step.

On each image layer, as shown in FIG. 14, repetitive calculation is performed based on the pixel level (luminance) of image fragments indicated by the reference characters 804, 805, each having a feature point at the center. In this embodiment, each image fragment is comprised of 9 pixels×9 pixels, of which the central one is the feature point. According to the Lucas-Kanade method, a luminance gradient is calculated. Suppose that the coordinates of the feature point are represented by (x, y), and the luminance at the coordinates in a past image is represented by Ip (x, y), and the luminance at the coordinates in a present image is represented by Ic (x, y), the luminance gradients Ix, Iy, and It at the feature point may be calculated by the following equations:

$Ix=Ip(x+1,y)-Ip(x-1,y);$ $Iy=Ip(x,y+1)-Ip(x,y-1);$ and $It=Ip(x,y)-Ic(x,y)$

Further, based on the luminance gradients, the magnitude of coordinate displacement for the repetitive calculation of an optical flow 803 may be calculated by the following equation:

$$\begin{bmatrix} n_x \\ n_y \end{bmatrix} = \begin{bmatrix} \sum I_x^2 & \sum I_x I_y \\ \sum I_x I_y & \sum I_y^2 \end{bmatrix}^{-1} \begin{bmatrix} -\sum I_x I_t \\ -\sum I_y I_t \end{bmatrix}$$ [Equation 1]

As can be seen from Equation 1, in this repetitive calculation, images need to be referred to every time to calculate the magnitude of coordinate displacement. Further, to calculate the next magnitude of coordinate displacement, a corresponding set of coordinates needs to be specified. Thus, there is dependency between the calculation procedures as indicated by the reference character 807 in FIG. 15. Then, a data path calculating a plurality of image fragments in parallel is provided so as to perform repetitive calculation on respective image fragments in parallel as indicated by the reference character 806 in FIG. 14. The reference character 806 conceptually indicates the repetitive calculations performed in parallel, for example. Specifically, the magnitude of coordinate displacement is obtained from the state where the coordinates are determined (as indicated by downward arrows), and then the next set of coordinates are determined (as indicated by upward arrows), or the magnitude of displacement of the next set of coordinates is obtained. Since the image fragments are independent of each other, the dependency between the calculation procedures may be eliminated as indicated by the reference character 808 in FIG. 15, and thus the calculation may be performed with improved efficiency by parallel processing.

An image recognition system according to the present disclosure is optimized in terms of circuit scale, power consumption, processing performance, and flexibility, and therefore, is useful for increasing the processing speed of higher definition image recognition processing.

What is claimed is:

1. An image recognition system for detecting and tracking at least an image portion associated with a predefined object from a moving picture, wherein
the image recognition system is configured to be able to perform:
an object detection processing step of detecting the object from the moving picture;
a tracking point specification processing step of specifying at least a predetermined point associated with the object as a tracking point;
a tracking target recognition processing step of recognizing an actual tracking target based on the tracking point;
a tracking processing step of tracking the tracking target; and
a determination processing step of determining the type of the tracking target's behavior based on a result of the tracking processing step,
wherein the tracking point specification processing step and the determination processing step are implemented by software, while the object detection processing step, the tracking target recognition processing step, and the tracking processing step are implemented by hardware,
the object detector performing the object detection processing step includes at least a feature quantity calculating unit, a plurality of posterior event memories storing posterior events, a posterior event updater, and a score calculating unit,
the feature quantity calculating unit calculates a feature quantity based on the moving picture,
the posterior event memories store at least both of a posterior event in an object image and a posterior event in a non-object image,
the posterior event updater updates the posterior event in the object image and the posterior event in the non-object image in accordance with a pattern of the feature quantity, and
the score calculating unit retrieves, from the posterior event memories, a posterior event corresponding to an arbitrary pattern of the feature quantity obtained from the feature quantity calculating unit, and calculates a score corresponding to the arbitrary pattern of the feature quantity.

2. The image recognition system of claim 1, wherein the object is a human.

3. The image recognition system of claim 1, further comprising:
hardware further including:
a tracking target recognizer capable of performing the tracking target recognition processing step,
a tracker capable of performing the tracking processing step, and
a CPU capable of performing the tracking point specification processing step and the determination processing step.

4. The image recognition system of claim 1, wherein
the tracker performing the tracking processing step performs repetitive calculation of a luminance gradient of image fragments,
the repetitive calculation of the luminance gradient being performed by sequentially referring to a memory storing the image fragments,
the image recognition system includes a plurality of calculating units performing the repetitive calculation of the luminance gradient, and associates the calculating units with the independent image fragments, respectively, so as to perform the repetitive calculation of the luminance gradient of the image fragments in parallel.

5. A semiconductor integrated circuit performing a processing step of detecting and tracking at least an image portion associated with a predefined object from a moving picture, the semiconductor integrated circuit comprising:
an object detector configured to perform a processing step of detecting the object from the moving picture,
a tracking target recognizer configured to perform a processing step of recognizing at least a predetermined point associated with the object as an actual tracking target,
a tracker configured to perform a processing step of tracking the tracking target,
a CPU configured to performing a processing step of specifying the predetermined point, and a processing step of determining the type of the tracking target's behavior based on a result of tracking obtained by the tracker,
a direct memory access (DMA) controller configured to transfer data to the object detector, the tracking target recognizer, and the tracker, the data being required by the object detector, the tracking target recognizer and the tracker to perform their respective processing steps, and
a data bus configured to couple together the object detector, the tracking target recognizer, the tracker, the CPU, and the DMA controller,
wherein the object detector includes at least a feature quantity calculating unit, a plurality of posterior event memories storing posterior events, a posterior event updater, and a score calculating unit,
the feature quantity calculating unit calculates a feature quantity based on the moving picture,
the posterior event memories store at least both of a posterior event in an object image and a posterior event in a non-object image,
the posterior event updater updates the posterior event in the object image and the posterior event in the non-object image in accordance with a pattern of the feature quantity, and
the score calculating unit retrieves, from the posterior event memories, a posterior event corresponding to an arbitrary pattern of the feature quantity obtained from the feature quantity calculating unit, and calculates a score corresponding to the arbitrary pattern of the feature quantity.

6. The semiconductor integrated circuit of claim 5, wherein
the CPU controls the operation of each of the object detector, the tracking target recognizer, the tracker, and the DMA controller.

7. The semiconductor integrated circuit of claim 6, further comprising:
a control bus coupled to the object detector, the tracking target recognizer, the tracker, and the DMA controller, and
a sequencer configured to relay the operation control by the CPU to the control bus.

8. The semiconductor integrated circuit of claim 5, wherein
the CPU performs control such that the processing step performed by the object detector finishes within a predetermined unit time, and performs repeatedly, based on a result of the processing step performed by the object detector, a processing step of specifying the predetermined point, control of the operation of the tracking target recognizer, control of the operation of the tracker, and a processing step of determining the type of the tracking target's behavior in each of a plurality of unit times continuous with the predetermined unit time.

9. The semiconductor integrated circuit of claim 8, wherein
the CPU performs at least two of the processing step of specifying the predetermined point, the control of the operation of the tracking target recognizer, the control of the operation of the tracker, and the processing step of determining the type of the tracking target's behavior in parallel in any one of the plurality of unit times.

10. The semiconductor integrated circuit of claim 9, wherein
the CPU performs control such that, when the object detector performs the processing step again after the predetermined unit time has passed, this processing step is performed in a unit time during which at least two of the processing step of specifying the predetermined point, the control of the operation of the tracking target recognizer, the control of the operation of the tracker, and the processing step of determining the type of the tracking target's behavior are performed.

* * * * *